United States Patent
Egashira

(10) Patent No.: US 7,922,584 B2
(45) Date of Patent: Apr. 12, 2011

(54) IMAGE GENERATION METHOD AND INFORMATION STORAGE MEDIUM WITH PROGRAM FOR VIDEO GAME IN WHICH OPERATION OF THE CONTROLLER BEYOND A PREDETERMINED ANGLE CAUSES A CHARACTER TO ATTACK

(75) Inventor: Norio Egashira, Yokohama (JP)

(73) Assignee: Namco Bandai Games, Inc., Tokyo (JP)

( * ) Notice: Subject to any disclaimer, the term of this patent is extended or adjusted under 35 U.S.C. 154(b) by 0 days.

(21) Appl. No.: 12/510,812

(22) Filed: Jul. 28, 2009

(65) Prior Publication Data

US 2009/0286599 A1 Nov. 19, 2009

Related U.S. Application Data

(62) Division of application No. 10/197,399, filed on Jul. 18, 2002, now abandoned.

(30) Foreign Application Priority Data

Jul. 27, 2001 (JP) ................................. 2001-227497

(51) Int. Cl.
 *A63F 13/06* (2006.01)
(52) U.S. Cl. ........................................................ 463/38
(58) Field of Classification Search .............. 463/36–39; 345/161; 348/211.7; 700/85
 See application file for complete search history.

(56) References Cited

U.S. PATENT DOCUMENTS

| | | | | |
|---|---|---|---|---|
| 4,546,966 A | * | 10/1985 | Segura | 482/88 |
| 5,012,231 A | * | 4/1991 | Felsenstein | 345/161 |
| 5,704,837 A | * | 1/1998 | Iwasaki et al. | 463/38 |
| 5,738,352 A | | 4/1998 | Ohkubo et al. | |
| 5,764,219 A | * | 6/1998 | Rutledge et al. | 345/159 |
| 5,868,652 A | * | 2/1999 | Spletzer | 482/105 |
| 5,903,257 A | * | 5/1999 | Nishiumi et al. | 345/157 |
| 5,963,196 A | * | 10/1999 | Nishiumi et al. | 345/161 |
| 6,059,660 A | | 5/2000 | Takada et al. | |
| 6,219,032 B1 | * | 4/2001 | Rosenberg et al. | 345/157 |
| 6,524,186 B2 | | 2/2003 | Takatsuka et al. | |

(Continued)

FOREIGN PATENT DOCUMENTS

JP A-06-168070 6/1994

(Continued)

*Primary Examiner* — David L Lewis
*Assistant Examiner* — Matthew D. Hoel
(74) *Attorney, Agent, or Firm* — Oliff & Berridge, PLC

(57) ABSTRACT

An image generation method and computer-readable information storage medium which stores a program in which a processing causes a first object to perform a motion based on control data from a first control lever which is tilted in an arbitrary direction and of which tilt angle is detectable. The processing also causes the first object to move based on control data from a second control lever which is tilted in an arbitrary direction and of which tilt angle is detectable. The processing further generates an image including an image of the first object and in which the first object is caused to perform an attack motion toward an attack direction which corresponds to a tilting direction of the first control lever, when the first control lever is tilted by a given angle. The attack motion of the first object changes according to at least one of a distance between the first and second object and an angle between a direction to which the first object faces and a direction in which the second object exists.

10 Claims, 19 Drawing Sheets

U.S. PATENT DOCUMENTS

| | | | |
|---|---|---|---|
| 6,544,125 B2 * | 4/2003 | Horigami et al. | 463/38 |
| 6,567,072 B2 * | 5/2003 | Watanabe | 345/161 |
| 6,580,418 B1 * | 6/2003 | Grome et al. | 345/161 |
| 6,589,118 B1 | 7/2003 | Soma et al. | |
| 6,623,359 B1 | 9/2003 | Yotoriyama | |
| 7,137,891 B2 * | 11/2006 | Neveu et al. | 463/31 |
| 7,182,691 B1 * | 2/2007 | Schena | 463/38 |
| 7,446,755 B1 * | 11/2008 | Goren | 345/161 |
| 2001/0003708 A1 * | 6/2001 | Aizu et al. | 463/7 |
| 2001/0021668 A1 | 9/2001 | Takeda et al. | |
| 2002/0065134 A1 * | 5/2002 | Ogata et al. | 463/37 |
| 2002/0068628 A1 * | 6/2002 | Takatsuka et al. | 463/40 |

FOREIGN PATENT DOCUMENTS

| | | | |
|---|---|---|---|
| JP | 06-315095 A | * | 11/1994 |
| JP | A-06-315095 | | 11/1994 |
| JP | A-08-281584 | | 10/1996 |
| JP | A-63-236128 | | 10/1998 |
| JP | A-11-076614 | | 3/1999 |
| JP | 11-244528 A | * | 9/1999 |
| JP | A-11-244528 | | 9/1999 |
| JP | 11-300038 A | * | 11/1999 |
| JP | A-2000-153061 | | 6/2000 |
| JP | A-2000-157745 | | 6/2000 |
| JP | A-2000-267801 | | 9/2000 |
| JP | A-2000-342853 | | 12/2000 |
| JP | A-2001-009161 | | 1/2001 |
| JP | 2001-129252 A | * | 5/2001 |
| JP | A-2001-129252 | | 5/2001 |
| JP | 2001-149648 A | * | 6/2001 |
| JP | A-2001-162048 | | 6/2001 |

* cited by examiner

RIGHT

| DIS-TANCE | MOTION |
|---|---|
| SHORT | RIGHT PUNCH |
| MIDDLE | RIGHT KICK |
| LONG | RIGHT FLYING KICK |

LEFT

| DIS-TANCE | MOTION |
|---|---|
| SHORT | LEFT HOOK |
| MIDDLE | LEFT AND BACK SPIN KICK |
| LONG | LEFT STEP KICK |

IMAGE GENERATION METHOD AND INFORMATION STORAGE MEDIUM WITH PROGRAM FOR VIDEO GAME IN WHICH OPERATION OF THE CONTROLLER BEYOND A PREDETERMINED ANGLE CAUSES A CHARACTER TO ATTACK

This is a Division of application Ser. No. 10/197,399 filed Jul. 18, 2002, which claims the benefit of Japanese Patent Application No. 2001-227497 filed on Jul. 27, 2001. The disclosures of the prior applications are hereby incorporated by reference herein in their entirety.

BACKGROUND

The present invention relates to a method, program and information storage medium for image generation.

There is known an image generating system (or game system) for generating an image as viewed through a virtual camera (or a given viewpoint) within an object space that is a virtual three-dimensional space. Such an image generating system is highly popular as one that can provide a so-called virtual reality.

For example, in an image generating system for fighting game, a player may use a game controller 10 (which is, in a broad sense, a control section) to control an object OB (or player's character), as shown in FIG. 1. The player will enjoy the game by causing the player's character to fight another object OB2 (or enemy character) which is controlled by another player or a computer.

In such a case, the game controller 10 includes a direction indicating key 12 and control buttons 14, 16, 18 and 20. When the direction indicating key 12 is depressed at its right or left side, the player's character moves rightward or leftward. If each of the control buttons 14, 16, 18 and 20 is depressed, the player's character OB1 thrusts a right punch, a left punch, a right kick or a left kick.

Such a control is effective for such a fighting game that the player's character OB1 battles the enemy character OB2 in a one-on-one manner.

However, such a control as shown in FIG. 1 is unsuitable for use in such a fighting game that the player's character OB1 fights a plurality of objects OB2 (multi-object fighting game). This raises a technical problem in that an operating environment (or interface environment) optimum for a player (which is, in a broad sense, an operator) cannot be provided.

SUMMARY

One aspect of the present invention relates to an image generation method of generating an image comprising:
 causing a first object to perform a motion based on control data from a first control lever which is tilted in an arbitrary direction and of which tilt angle is detectable;
 causing the first object to move based on control data from a second control lever which is tilted in an arbitrary direction and of which tilt angle is detectable;
 generating an image including an image of the first object; and
 causing the first object to perform an attack motion toward an attack direction which corresponds to a tilting direction of the first control lever, when the first control lever is tilted by a given angle.

Another aspect of the present invention relates to an image generation method of generating an image comprising:
 causing a first object to perform a motion based on control data from a first control lever which is tilted in an arbitrary direction and of which tilt angle is detectable;
 generating an image including an image of the first object;
 changing the attack motion of the first object according to at least one of a distance between the first object and a second object and an angle between a direction to which the first object faces and a direction in which the second object exists.

Further aspect of the present invention relates to an image generation method of generating an image comprising:
 causing a first object to perform a motion based on control data from a first control lever which is tilted in an arbitrary direction and of which tilt angle is detectable;
 generating an image including an image of the first object; and
 causing the first object to perform a motion for taking an action against a second object, when the second object exists within a given direction range determined by a tilting direction of the first control lever.

Still another aspect of the present invention relates to an image generation method of generating an image comprising:
 causing a first object to perform a motion based on control data from a first control lever which is tilted in an arbitrary direction and of which tilt angle is detectable; and
 generating an image including an image of the first object, and
 changing a motion of the first object according to at least one of a first time period required to tilt the first control lever from the neutral position by a given angle and a second time period until the first control lever returns from the tilted state to the neutral position by reaction force.

Still further aspect of the present invention relates to an image generation method of generating an image comprising:
 causing a first object to perform a motion based on control data from a first control lever which is tilted in an arbitrary direction and of which tilt angle is detectable;
 generating an image including an image of the first object; and
 causing the first object to initiate a motion, when the first control lever is tilted by a first angle; and
 determining a direction in which the first object performs the motion, when the first control lever is tilted thereafter by a second angle which is larger than the first angle.

DETAILED DESCRIPTION OF EMBODIMENTS

Figure 1:
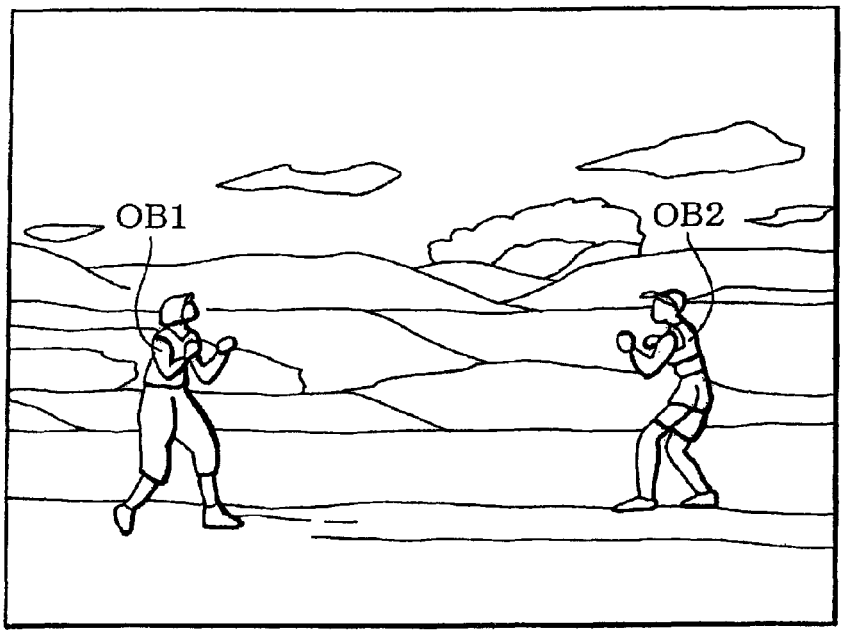
FIG. 1 illustrates a conventional process of controlling a fighting game.
Figure 1:
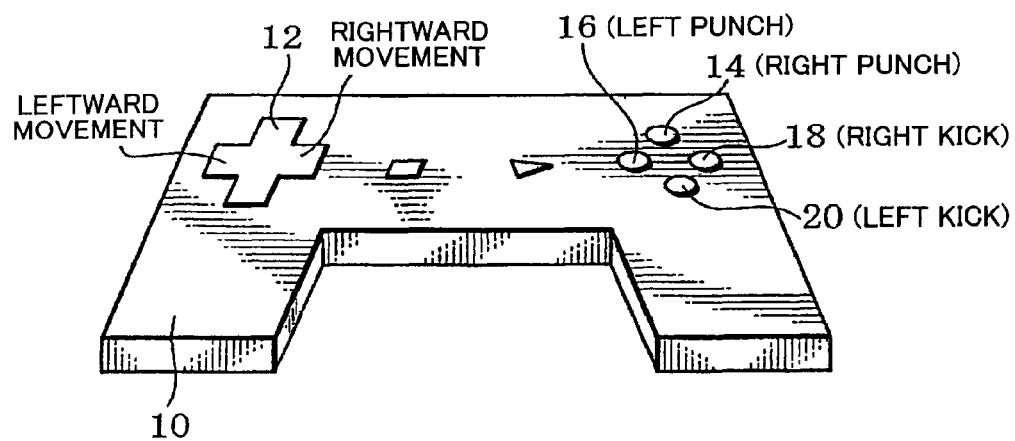

This embodiment will now be described.

Note that the embodiments described herein do not in any way limit the scope of the invention as laid out in the claims. Similarly, the entirety of the configuration described for these embodiments does not place any limitations on the essential components of the means in accordance with the present invention.

One embodiment of the present invention relates to an image generation method of generating an image comprising:
  causing a first object to perform a motion based on control data from a first control lever which is tilted (pushed) in an arbitrary direction and of which tilt angle (an angle of the first control lever from the neutral position) is detectable;
  causing the first object to move based on control data from a second control lever which is tilted in an arbitrary direction and of which tilt angle is detectable; and
  generating an image including an image of the first object; and
  causing the first object to perform an attack motion toward an attack direction which corresponds to a tilting direction of the first control lever, when the first control lever is tilted by a given angle.

According to this configuration, when the second control lever is tilted, the first object moves in a direction corresponding to a tilting direction of the second control lever. On the other hand, when the first control lever is tilted by a given angle, the first object performs an attack motion (e.g., a motion in which an object thrusts a part object or the like in the direction of attack) in a direction corresponding to a tilting direction of the first control lever.

Thus, only by tilting the first control lever by a given angle, the first object performs the attack motion in the direction corresponding to the tilting direction of the first control lever. This provides a simplified control environment which can intuitively be understood by a player.

Moreover, the player (or operator) can cause the first object to perform a motion through the second control lever while moving the first object through the second control lever. This also provides a player with a preferred control environment.

When the maximum tilt angle of the first control lever is $\beta MAX$ and the accuracy of the tilt angle is $\beta AC = \beta MAX/N$, a given tilt angle $\beta 1$ of the first control lever can be represented by $\beta 1 = \beta AC \times K$ ($K<N$), for example.

In this configuration, the image generation method may comprise:
  changing the attack motion of the first object according to at least one of a distance between the first and second objects and an angle between a direction to which the first object faces and a direction in which the second object exists.

In this configuration, the image generation method may comprise:
  causing the first object to perform the attack motion against a second object, when the second object exists within a given direction range determined by a tilting direction of the first control lever.

In this configuration, the image generation method may comprise:
  changing the attack motion of the first object according to at least one of a first time period required to tilt the first control lever from the neutral position by a given angle and a second time period until the first control lever returns from the tilted state to the neutral position by reaction force.

In this configuration, the image generation method may comprise:
  causing the first object to initiate the attack motion, when the first control lever is tilted by a first angle; and
  determining a direction in which the first object performs the attack motion, when the first control lever is tilted thereafter by a second angle which is larger than the first angle.

Another embodiment relates to an image generation method of generating an image comprising:
  causing a first object to perform a motion based on control data from a first control lever which is tilted in an arbitrary direction and of which tilt angle is detectable;
  generating an image including an image of the first object; and
  changing the attack motion of the first object according to at least one of a distance between the first object and a second object and an angle between a direction to which the first object faces and a direction in which the second object exists.

According to this configuration, the motion of the first object can multiply be changed according to a distance between the first object and a second object and an angle between a direction to which the first object faces (e.g., frontward direction) and a direction in which the second object exists (e.g., a direction connecting the first and second objects, a tilting direction, or a direction of action). Thus, the multiple motions can be represented through a simple operation.

Further embodiment of the present invention relates to an image generation method of generating an image comprising:
  causing a first object to perform a motion based on control data from a first control lever which is tilted in an arbitrary direction and of which tilt angle is detectable;
  generating an image including an image of the first object; and
  causing the first object to perform a motion for taking an action against a second object, when the second object exists within a given direction range determined by a tilting direction of the first control lever.

According to this configuration, the first object can be caused to perform a motion for taking an action against the second object, even when a direction of action (such as a direction of attack) corresponding to a tilting direction of the first control lever is not completely consistent with a direction in which the second object exists. Thus, the motion of the first object can be determined by a simple process.

In this configuration, the image generation method may comprise:

causing the first object to perform a motion corresponding to an angle between a direction to which the first object faces and a tilting direction of the first control lever, when the second object does not exist within a given direction range determined by a tilting direction of the first control lever.

Thus, even a motion of the first object which indicates a failure of the action can realistically be represented.

Still another embodiment of the present invention relates to an image generation method of generating an image comprising:

causing a first object to perform a motion based on control data from a first control lever which is tilted in an arbitrary direction and of which tilt angle is detectable;

generating an image including an image of the first object; and changing a motion of the first object according to at least one of a first time period required to tilt the first control lever from the neutral position by a given angle and a second time period until the first control lever returns from the tilted state to the neutral position by reaction force.

According to this configuration, a motion of the first object can be changed according to a time period for tilting the first control lever (or tilting speed) or a time period until the first control lever returns (or returning seed). Therefore, the multiple motion of the first object can be represented in an operating environment which does not provide any artificiality to the player.

In this configuration, the image generation method may comprise:

changing the motion of the first object according to the sum of the first and second time periods.

Thus, any uncertain factor on measuring the time period can be reduced while realizing an environment of quick operation.

In this configuration, the image generation method may comprise:

causing the first object to initiate a first motion when the first control lever is tilted by a first angle;

continuing the first object to perform the first motion, when any one of the first time period, the second time period, and the sum of the first and second time periods is shorter than a given time period; and causing the first object to perform a second motion, when any one of the first time period, the second time period, and the sum of the first and second time periods is longer than the given time period.

Thus, an environment of quick operation can be realized since the first motion is initiated at a point of time when the first control lever has been tilted by a given angle. In addition, multiple motion can be represented while reducing any uncertain factor on measuring the time period, since either of the first or second motion is determined to be performed according to the first time period, second time period, or the sum of the first and second time periods.

Still further embodiment of the present invention relates to an image generation method of generating an image comprising:

causing a first object to perform a motion based on control data from a first control lever which is tilted in an arbitrary direction and of which tilt angle is detectable;

generating an image including an image of the first object;

causing the first object to initiate a motion, when the first control lever is tilted by a first angle; and determining a direction in which the first object performs the motion, when the first control lever is tilted thereafter by a second angle which is larger than the first angle.

According to this configuration, the motion of the first object is provisionally initiated when the first control lever is tilted by the first angle. Thus, the environment of quick operation can be realized. When the first control lever is subsequently tilted by the second angle, the direction in which the first object performs its motion (e.g., the direction of motion, the direction of action or the direction of attack) is determined. Even when the first control lever is moved in a serpentine manner, the motion of the first object can be performed in a direction intended by the player.

In this configuration, the image generation method may comprise:

compensating the first object to face a direction which corresponds to a tilting direction of the first control lever, when the first control lever is tilted by a second angle which is larger than a first angle.

Thus, the orientation of the first object may be changed while performing the motion. This can provide a representation of motion which does not provide any sense of artificiality to the player.

In this configuration, the image generation method may comprise:

moving the first object based on control data from a second control lever which is tilted in an arbitrary direction and of which tilt angle is detectable.

Thus, a preferred environment of operation can be provided which can control the movement of the first object through the second control lever while controlling the motion of the first object through the first control lever.

This embodiment will be described in further detail with reference to the drawing.

1. Configuration

Figure 2:
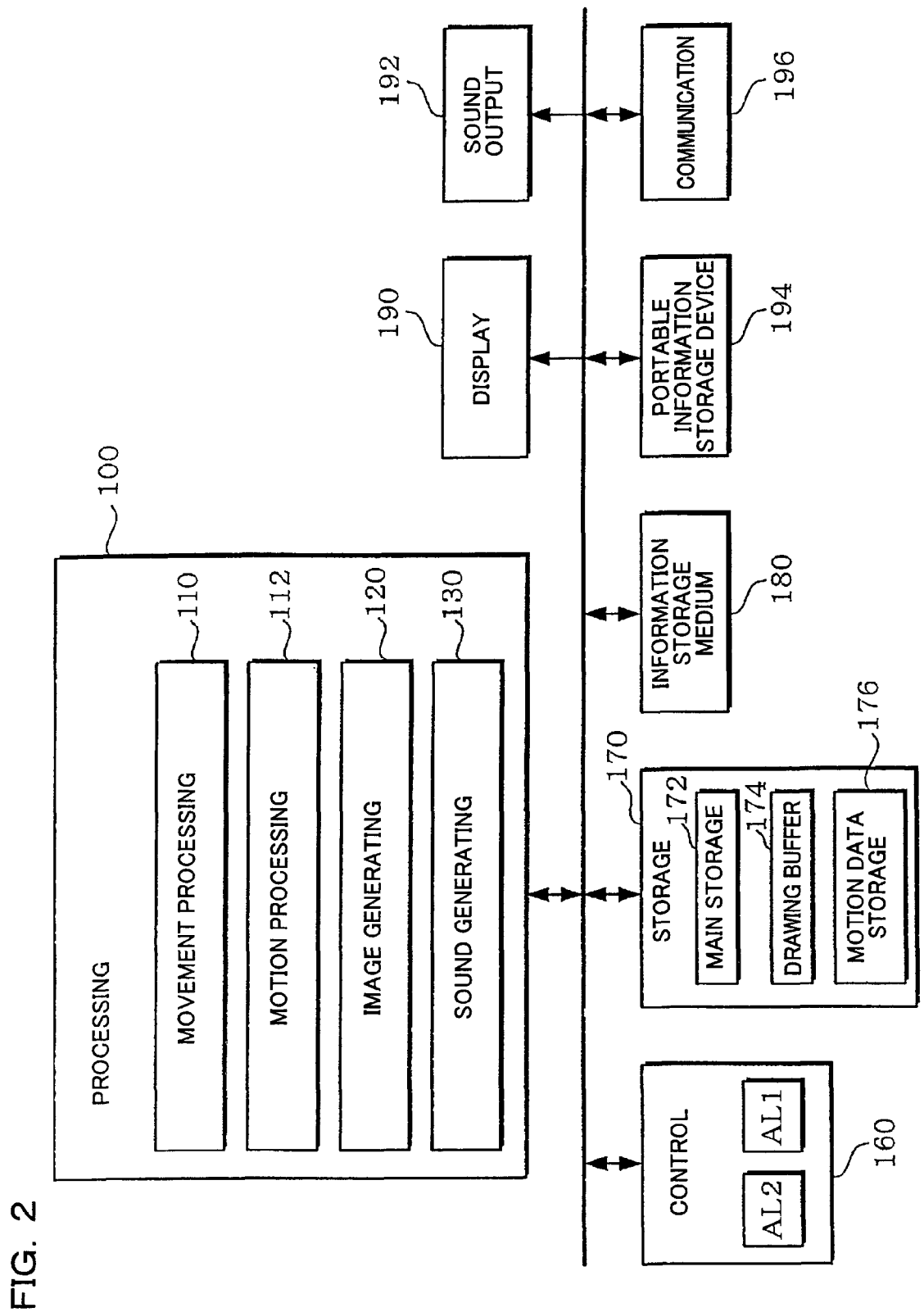
FIG. 2 is a functional block diagram of an image generating system according to this embodiment.

FIG. 2 shows a block diagram of an image generating system (or game system) according to this embodiment. In this figure, this embodiment may comprise at least a processing section 100 (or a processing section 100 with a storage section 170). Each of the other blocks may take any suitable form.

A control section 160 is used to input operational data from the player and the function thereof may be realized through any suitable hardware means such as a lever, a button, a housing or the like.

The storage section 170 provides a working area for the processing section 100, a communication section 196 and others. The function thereof may be realized by any suitable hardware means such as RAM or the like.

An information storage medium (which may be a computer-readable storage medium) 180 is designed to store information including programs, data and others. The function thereof may be realized through any suitable hardware means such as optical memory disk (CD or DVD), magneto-optical disk (MO), magnetic disk, hard disk, magnetic tape, memory (ROM) or the like. The processing section 100 performs various processings in the present invention (or this embodiment) based on a program (or data) that has been stored in this information storage medium 180. In other words, the information storage medium 180 stores (or records) a program for causing a computer to operate as the respective one of various sections or portions (which are particularly the blocks included in the processing section 100) in the present invention or this embodiment (that is, a program for causing a computer to realize the respective processings). Such a program may contain one or more modules (as well as object-oriented objects), for example.

Part or the whole of the information stored in the information storage medium 180 will be transferred to the storage section 170 when the system is initially powered on. The information stored in the information storage medium 180 may contain at least one of program code set for processing the present invention, image data, sound data, shape data of objects to be displayed, table data, list data, information for instructing the processings in the present invention, information for performing the processings according to these instructions and so on.

A display section 190 is to output an image generated according to this embodiment and the function thereof can be realized by any suitable hardware means such as CRT, LCD or HMD (Head-Mount Display).

A sound output section 192 is to output a sound generated according to this embodiment and the function thereof can be realized by any suitable hardware means such as speaker.

A portable information storage device 194 is to store the player's personal data and save data and may be take any suitable form such as memory card, portable game machine and so on.

A communication section 196 is designed to perform various controls for communication between the game system and any external device (e.g., host device or other image generating system). The function thereof may be realized through any suitable hardware means such as various types of processors or communication ASIS or according to any suitable program.

The program (or data) for causing the computer to realize the respective processings in the present invention or this embodiment may be delivered from an information storage medium included in a host device (or server) to the information storage medium 180 through a network and the communication section 196. The use of such an information storage medium in the hose device (or server) falls within the scope of the invention.

The processing section (processor) 100 is to perform various processings such as game processing, image generating or sound generating, based on the control data or program from the control section 160. In such a case, the processing section 100 performs various processings using a main storage section 172 in the storage section 170 as a working area.

The processing section 100 may be designed to perform various processes such as coin (or charge) reception, setting of various modes, game proceeding, setting of scene selection, determination of the position and rotation angle (about X-, Y- or Z-axis) of an object, movement of the object (motion processing), determination of the position of the viewpoint (or virtual camera) and the angle of visual line (or the rotational angle of the virtual camera), arrangement of the object within the object space, hit checking, computation of the game results (or scores), processing for causing a plurality of players to play in a common game space and various other game processings including game-over.

The processing section 100 comprises a movement processing section 110, a motion processing portion 112, an image generating section 120 and a sound generating section 130. However, the processing section 100 is not required to include all of these functions.

The movement processing section 110 is designed to control the movement of an object (i.e., a moving object such as a character, robot, motorcar, tank or the like).

More particularly, the movement processing section 110 performs a process of moving (or translating or rotating) an object within an object space (or game space). Such a process of moving the object can be realized by determining the position or rotation angle of the object in the present frame (inter), based on the operational data from the control section 160 or the position or rotation angle (or direction) of the same object in the previous frame (e.g., before 1/60 seconds or 1/30 seconds). For example, if it is assumed that the position and rotation angle of the object in a frame (k−1) are respectively Pk−1 and θk−1 and that the amount of positional change (or velocity) and the amount of rotational change (rotational velocity) in the object at one frame are respectively ΔP and Δθ, the position Pk and rotation angle θk of the object at a frame k may be determined according to the following formulas (1) and (2):

$$Pk = Pk-1 + \Delta P \tag{1}$$

$$\theta k = \theta k-1 + \Delta \theta \tag{2}$$

The motion processing portion 112 performs a process of causing an object to perform a motion (or animation) (i.e. motion play or motion generation). The processing for the motion of the object can be realized by playing it based on a motion data which has been stored in a motion data storage section 176.

More particularly, the motion data storage section 176 has stored the motion data containing the position or rotation angle of each of part objects forming an object (or skeleton) (or motion bones forming a skeleton). The motion processing portion 112 is designed to read out this motion data and to play the motion of the object by moving the part objects of the object (or by deforming the shape of the skeleton of the object) based on the read out motion data.

It is desirable that the motion data stored in the motion data storage section 176 has been prepared by capturing the motion of a real person on which various sensors are mounted. However, the motion data may be generated in real time through a physical simulation (which is a simulation utilizing a physical calculation which may be a pseudo-calculation).

It is further desirable that the motion play is performed using a motion interpolation or inverse kinematics so as to play a realistic motion with less motion data.

In this embodiment, the control section 160 includes analog levers AL1 and AL2 (which are, in a broad sense, first and second control levers that can be tilted in any direction and that can detect the angles of the first and second control levers).

The movement processing section 110 is designed to move an object (or character) based on the control data from the analog lever AL2 (or second control lever) which may contain volume values in the first and second axial directions.

More particularly, the object is moved in a direction of movement corresponding to the tilting direction of the analog lever AL2 (or second control lever) is tilted. (The direction of movement may be defined in a one-to-one manner corresponding to an arbitrary tilting direction.) In such a case, the velocity of the moving object may be changed depending on the angle of the analog lever AL2. It is further desirable that when the object is moved by the analog lever AL2, the object is caused to perform a motion of movement corresponding to the velocity of object movement (e.g., walking or running motion).

The motion processing portion 112 is designed to perform a process of causing the object (or character) to perform a motion based on the control data of the analog lever AL1 (or first control lever) which may contain volume values in the first and second axial directions, for example. Such a process may include a motion play and/or motion generation.

More particularly, the object is caused to perform a motion (or action motion) in a direction of action corresponding to the tilting direction of the analog lever AL1, which direction of action may be determined corresponding to an arbitrary tilting direction in a one-to-one manner, such that a direction of attack, a direction of guard, a direction of ball hit, a direction of ball catch or a direction of item taking. In other words, the object is caused to perform a motion in which the part objects (hand and leg objects) of a object are moved or another motion in which the representative point of the object is shifted in position, in this direction of action.

In this embodiment, furthermore, the object may be changed in motion (or provide different motions) depending on a distance between the objects (or first and second objects), a time required to tilt the analog lever AL1 by a given angle (or a velocity at which the analog lever AL1 is tilted), or a time required for the analog lever AL1 to return to its neutral position under reaction force (or a velocity at which the analog lever AL1 returns to its neutral position).

In this embodiment, it is judged whether or not the other object (or second object) to be attacked by the player's object exists within a range of direction determined by the tilting direction of the analog lever AL1 (or a range of direction selected from plural pre-divided ranges of direction depending on the tilting direction). If so, the object (or first object) is caused to perform an action motion in which an action is provided to the other object.

In this embodiment, the motion of the object hastens to be initiated (or the motion play is started) if the analog lever AL1 is tilted by an angle $\beta 1$ (e.g., an angle required to secure a play). For example, if the analog lever AL1 is further tilted to another angle $\beta 2$ ($\beta 2 > \beta 1$) for a predetermined time period, the direction of motion (the direction of action) in the object is determined.

The image generating section 120 processes, generates and outputs an image toward the display section 190, based on the results of various processings in the processing section 100. For example, with generation of a so-called three-dimensional game image, the coordinate transformation, clipping, perspective transformation or light-source calculation is first carried out. The results of that processing are then used to prepare a drawing data (e.g., positional coordinates given to a vertex (or configuration point) of a primitive face, texture coordinates, color (brightness) data, normal vector or $\alpha$-value). Based on this drawing data (or primitive face data), the image of the geometry-processed object (one or more primitive faces) is drawn in a drawing buffer 174 (or a buffer which can store the image information by pixel, such as a frame buffer or a work buffer). Thus, an image visible from a virtual camera (or a given viewpoint) within the object space can be generated.

The sound generating section 130 is designed to process, generate and output BGMs, sound effects or voices toward the sound output section 192, based on the results of various processings in the processing section 100.

The image generating system of this embodiment may be dedicated for a single-player mode in which only a single player can play the game or may have a multi-player mode in which a plurality of players can play the game.

If a plurality of players play the game, only a single terminal may be used to generate game images and sounds to be provided to all the players. Alternatively, a plurality of terminals (game machines or portable telephones) interconnected through a network (transmission line or communication line) may be used in the present invention.

2. Features of this Embodiment

Features of this embodiment will now be described with reference to the drawing. Although a fighting game to which this embodiment is applied will mainly be described below, this embodiment may broadly be applied to any of various other games.

2.1 Attack Motion Through Analog Levers

Figure 3A:
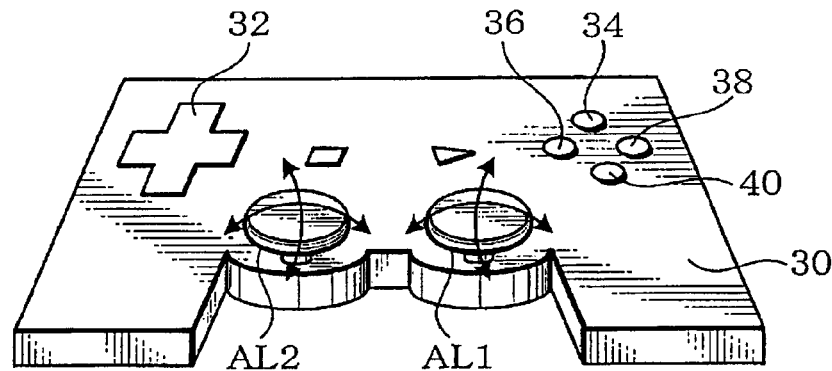
FIGS. 3A, 3B and 3C illustrate a procedure of sensing the angle and direction of a tilted analog lever.

FIG. 3A shows a game controller 30 (which is, in a broad sense, a control section) usable in this embodiment. This game controller 30 is provided with a direction indicating key (or cross key) 32, control buttons 34, 36, 38 and 40, and analog levers AL1 and AL2 (or first and second control levers).

Each of these analog levers (or analog sticks or analog direction keys) AL1 and AL2 is a control lever which can be tilted in any direction (or by any angle between 0 and 360 degrees) as shown in FIG. 3A and of which tilted angle is detectable. Any conventional digital (or binary) control lever can only detect a binary value, that is, a value when the lever is in its neutral position or a value when the lever is tilted. On the contrary, the analog levers AL1 and AL2 can detect a tilted angle represented by a multilevel value (ternary or higher value). For example, if it is assumed that the maximum tilt angle is $\beta$MAX, the tilt angle can be detected with an accuracy of $\beta$MAX/N (N$\geq$3).

Figure 3B:
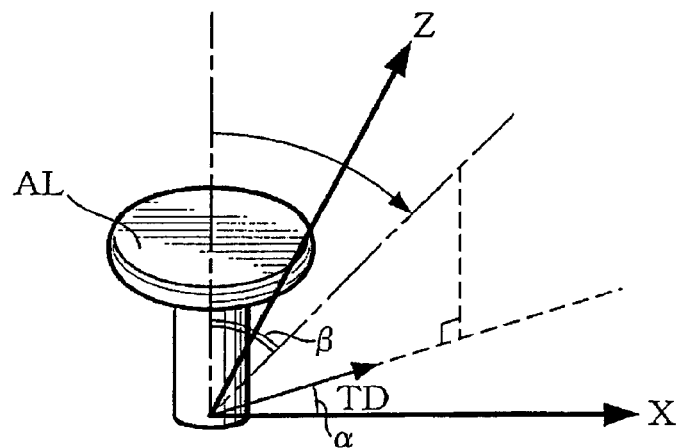

More particularly, as shown in FIG. 3B, each of the analog levers AL1 and AL2 can detect its tilt angle $\beta$ and its tilting direction TD (e.g., an angle $\alpha$ included between that lever and X-axis).

Namely, the one analog lever AL (AL1 or AL2) comprises a first sensor (not shown) for sensing a volume value XVL in a direction of X-axis (which is, in a broad sense, a first axis) and a second sensor (not shown) for sensing a volume value ZVL in a direction of Z-axis (which is, in a broad sense, a second axis). These volume values XVL and ZVL (e.g., values between 0 and 255) correspond to rotation angles about Z- and X-axes, respectively.

Figure 3C:
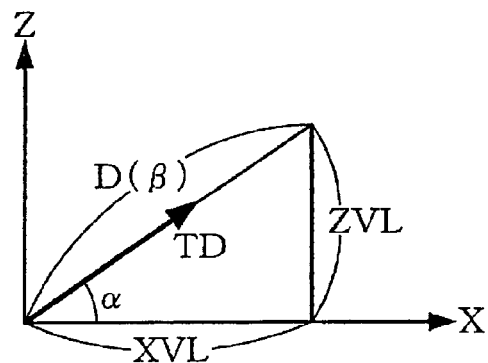

As shown in FIG. 3C, the volume values XVL and ZVL (or first and second coordinate components of the control vector) detected by the first and second sensors are then used to calculate a distance D corresponding to the tilt angle $\beta$ of one analog lever AL (AL1 or AL2), that is, $D=(XVL^2+ZVL^2)^{1/2}$ (or the length of the control vector). These volume values XVL and ZVL are also used to calculate an angle $\alpha$ corresponding to the tilting direction TD (or the direction of the control vector) in the one analog lever AL (AL1 or AL2), that is, $\alpha=\tan^{-1}(ZVL/XVL)$.

The tilt angle $\beta$ (or distance D) and the tilting direction TD (or angle $\alpha$) are then used to perform the processings of object movement and motion.

Figure 4A:
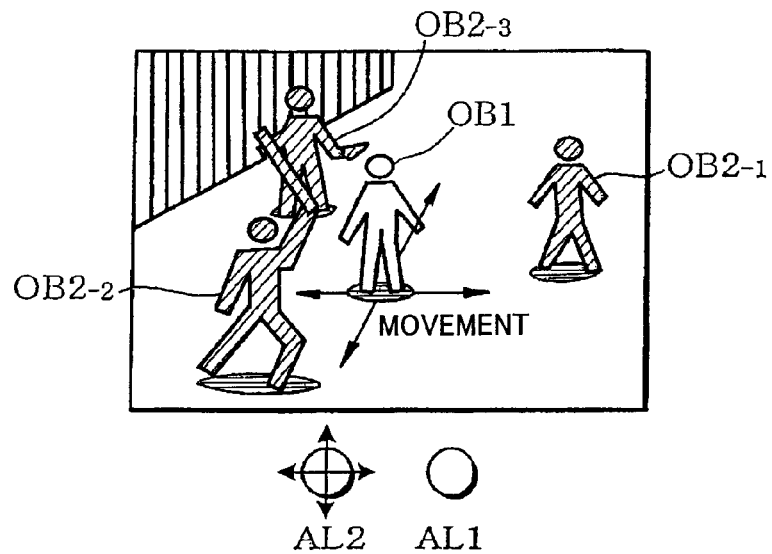
FIGS. 4A, 4B and 4C illustrate a process of performing the control using analog levers AL1 and AL2 according to this embodiment.

More particularly, as shown in FIG. 4A, the direction in which the analog lever AL2 (or second control lever) is tilted is detected. In a direction of movement corresponding to such a tilting direction, an object OB1 (or a first object to be controlled or player's character) is moved. For example, if the analog lever AL2 is tilted forward, backward, leftward or rightward, the object OB1 is also moved forward, backward, leftward or rightward within the object space. In such a case, the object OB1 may be moved in any direction of movement (or with any angle between 0 and 360 degrees) since the analog lever AL2 can be tilted in any direction (or by any angle between 0 and 360 degrees). Furthermore, the velocity of the moving object OB1 can also be changed based on the tilt angle β in the analog lever AL2.

Figure 4B:
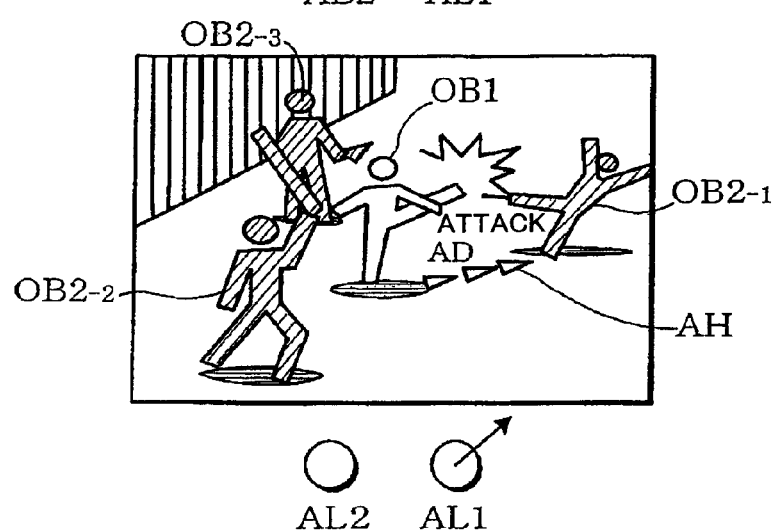
Figure 4C:
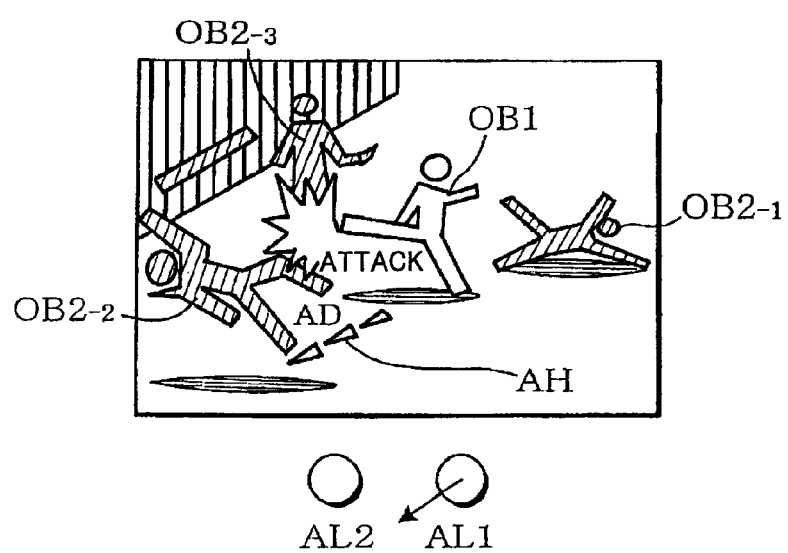

On the other hand, as shown in FIG. 4C, the direction TD in which the analog lever AL1 is tilted by a given angle (e.g., a fine angle within 0 and 10 degrees) is detected. In a direction of attack AD corresponding to that tilting direction TD (which is, in a broad sense, a direction of action), the object OB1 takes a motion of attack (which is, in a broad sense, a motion or action motion).

In FIG. 4B, for example, when the analog lever AL1 is tilted rightward and forward, the object OB1 performs an attack motion in the rightward and forward direction. This attack hits another object OB2-1 (or the second object to be subjected to this action) located at the rightward and forward position.

On the other hand, FIG. 4C shows that since the analog lever AL1 is tilted leftward and backward, the object OB1 performs the attack motion in the leftward and backward direction. This attack hits still another object OB2-2 located at the leftward and backward position.

In such a manner, this embodiment performs the processing of moving the object OB1 based on the control data from the analog lever AL2 and the processing of motion in the object OB2 based on the control data from the analog lever AL1. Thus, this embodiment can provides a preferred control environment to the player in comparison with the prior art described in connection with FIG. 1.

More particularly, in the control method of FIG. 1, the player cannot explicitly specify the direction of attack in the object OB1 (or player's character). This provided an operating environment (or interface environment) which cannot easily be understood by the player by intuition.

On the contrary, in the control method of this embodiment shown in FIGS. 4A, 4B and 4C, the player can explicitly specify the direction of attack AD (or the direction of action) in the object OB1 depending on the tilting direction of the analog lever AL1. Therefore, this embodiment can provide an operating environment which can easily be understood by the player by intuition.

Furthermore, the control method of FIG. 1 must execute an attack after the orientation of the object OB1 has been modified to face the object OB2. For example, if the object OB1 moves behind the object OB2, the attack against the object OB2 must be performed after the orientation of the object OB1 has been modified from the rightward direction to the leftward direction.

On the contrary, the control method of this embodiment can simultaneously realize both the motions of movement and attack of the object OB1. In other words, the attacks can be executed in all the directions through only one action without modification of the orientation of the object OB1 for each attack. This simplifies the control method.

As shown in FIG. 4B, for example, the object OB1 can take an attack against the other object OB2-1 through only one action in which the analog lever AL1 is tilted rightward and forward, without modification of the orientation of the object OB1. Similarly, as shown in FIG. 4C, the object OB1 can take an attack against the other object OB2-2 through only one action in which the analog lever AL1 is tilted leftward and backward.

In addition, the control method of FIG. 1 is not suitable for use in such a type of game that the object OB1 battles a number of objects OB2 (or multi-player battle game) since this control method cannot explicitly specify the direction of attack.

On the contrary, the control method of this embodiment can provides a preferred control environment for the multi-player battle game since this control method can take an attack in any direction through a simplified process. More particularly, such a game that the object OB1 controlled by the player battles a number of enemy's objects OB2 can be realized, as shown in FIGS. 4A, 4B and 4C. This can improve the feel of the player for virtual reality.

In this embodiment, furthermore, a plurality of game players can compete for their skills based on the accuracy relating to the directions in which the analog levers AL1 and AL2 are tilted. This can provide an operating environment which can easily be understood by the players.

It is desirable to provide an indication which represents the direction of attack AD (or the direction of motion) in the object OB1, as shown in FIGS. 4B and C. This may be an arrow AH extending from the position of the object OB1 toward the direction of attack AD (or the direction in which an enemy object exists). Thus, a player can immediately and explicitly recognize the direction of the attack performed by the player.

The arrow AH may be continuously extended depending on the tilt angle in the analog lever AL1.

If it is judged that the input has been established from a fixed tilt angle in the analog lever AL1, the image (or design) of the arrow AH may be changed to indicate the establishment of input to the player.

If the player continuously tilts the analog lever AL1 in a plurality of directions, all the arrows AH indicating the establishments of input may be left in all the directions.

In addition, if the input of attack cannot be made for such a reason that the motion play of attack in the object OB1 is not lasted or that the object OB1 is damaged, the arrow AH may not be indicated to advise the player that the input is now impossible.

2.2 Change of Attack Motion Depending on the Relationship of Distance or Direction The present invention changes the motion of attack (or motion) of the object OB1 depending on at least one of the distance and direction relationships between the objects OB1 and OB2.

Figures 5A, 5B, 5C:
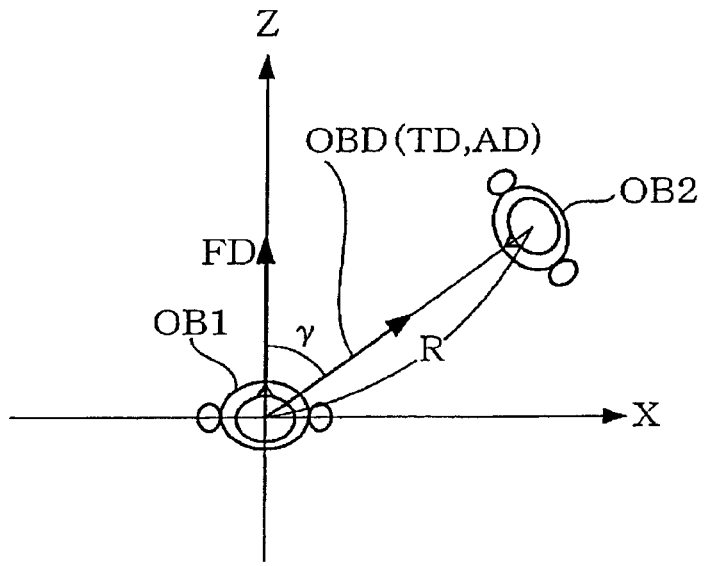
FIGS. 5A, 5B and 5C illustrate a technique of changing the motion of an object OB1 depending on the distance between the object OB1 and another object OB2 or an angle included between a direction to which the object OB1 faces and a direction in which the object OB2 exists.

As shown in FIG. 5A, the motion of attack in the object OB1 may be changed depending on a distance R between the objects OB1 and OB2 or an angle γ included between a direction FD (or frontal direction or face direction) to which the object OB1 faces and a direction in which the object OB2 exists (or a direction OBD connecting between the objects OB1 and OB2 or a tilting direction TD in the analog lever or a direction of attack AD corresponding to the tilting direction TD).

For example, if the object OB2 exists rightward relative to the object OB1 (γ=90 degrees), the motion of attack may be changed as shown in FIG. 5B. More particularly, the object OB1 may be caused to perform different motions of attack, for example, a right punch when the distance R is short, a right kick when the distance R is middle and a right flying kick when the distance R is long.

If the object OB2 exists leftward relative to the object OB1 (γ=−90 degrees), the motion of attack may be changed as shown in FIG. 5C. More particularly, the object OB1 may be caused to perform different motions of attack, for example, a left hook when the distance R is short, a left and back spin kick when the distance R is middle and a left step kick when the distance R is long.

Thus, a more realistic game picture improved in game effect can be generated through a simplified process since the motion of attack in the object OB1 is multiply changed depending on the distance R and/or angle γ.

In the prior art control method of FIG. 1, the depression of the control buttons 14, 16, 18 and 20 can only take the standard motions of attack such as the right punch, left punch, right kick and left kick. In order to cause the object OB1 to perform any specific motion of attack other than these standard motions of attack, the player must perform a specific combination of control buttons or a specific combination of control buttons and direction indicating key. For example, the player must perform such a specific operation that the control buttons 14 and 16 are simultaneously depressed or that the control button 18 is depressed while depressing the rightward part of the direction indicating key 12.

However, such specific operations could not be understood intuitively by the player since they did not correlate with the actual motion of the object OB1. Since the player must master specific complicated operations set for each object, he or she could not easily control the game. This caused that a beginner avoided such a game play.

On the contrary, this embodiment can cause the object OB1 to perform an optimum motion of attack depending on the distance R and/or angle γ. Therefore, an operating environment that the player can easily be understood by intuition can be realized according to this embodiment. In addition, the motion of attack in the object OB1 can automatically be determined depending on the angle γ determined by the tilting direction of the analog lever AL1 or the distance R between the object OB1 and the enemy object OB2. As a result, multiple motions of attack in the object OB1 can be realized even if the player does not learn the specific operations. This can also generate a more realistic game picture under a simplified control environment.

However, the present invention may equivalently be applied to such a case where the motion in the object OB1 is changed depending on parameters which are mathematically equivalent to the distance R and angle γ.

FIG. 6A to FIG. 9 show various game pictures generated according to this embodiment.

Figure 6A:
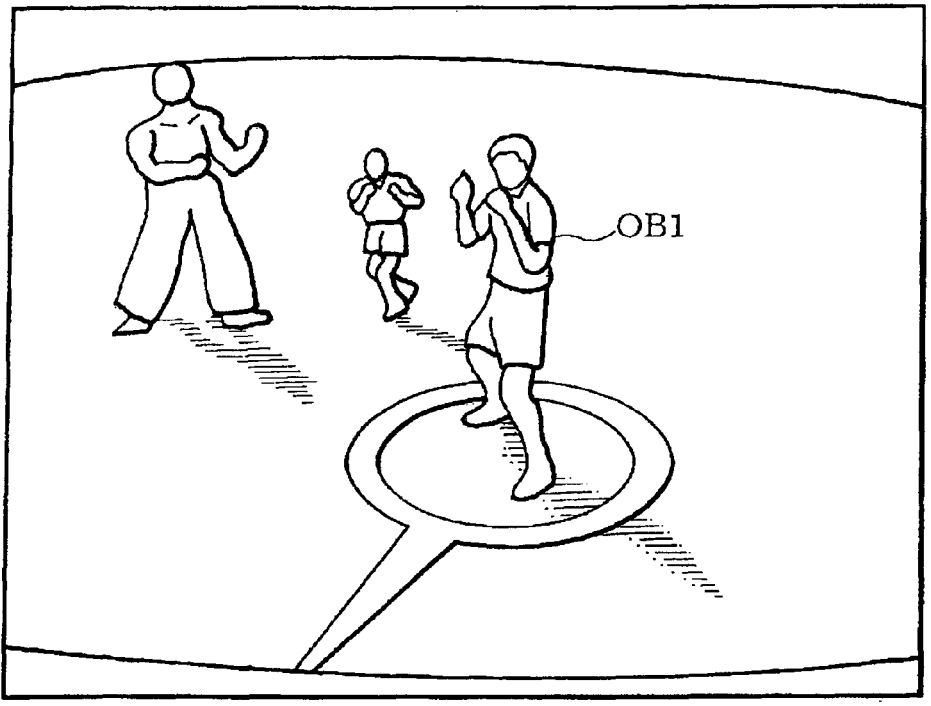
FIGS. 6A and 6B show game pictures generated according to this embodiment.

FIG. 6A shows a game picture in which the object OB1 stands in a basic attitude. In FIG. 6A, the direction in which the eyes and nose of the object face (or the direction of arrow indicated on the ground) is the direction to which the object faces (FD in FIG. 5A).

Figure 6B:
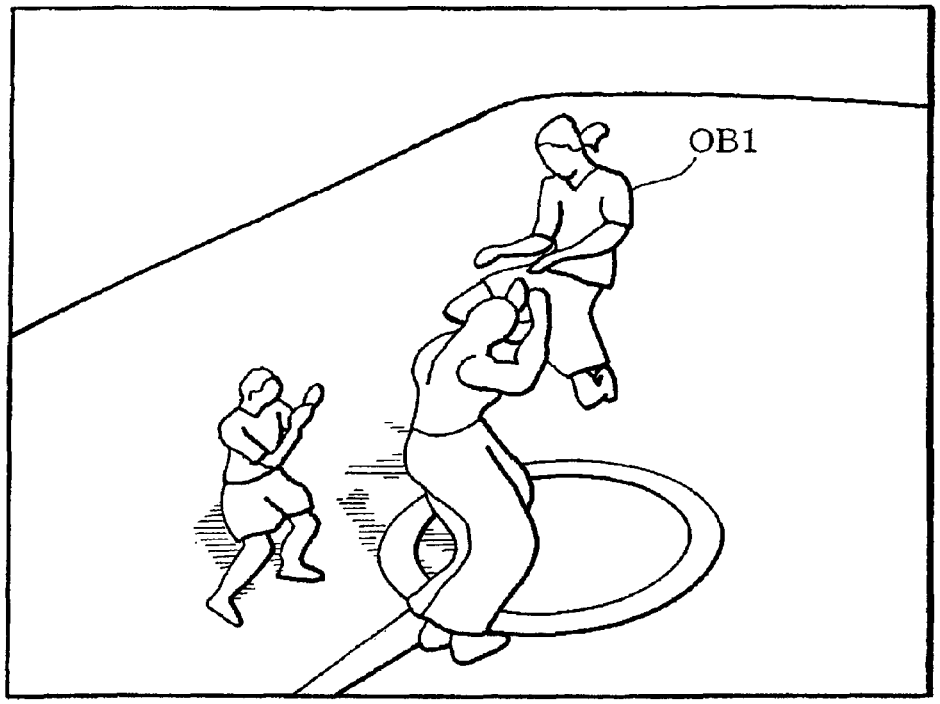

FIG. 6B shows a game picture in which the object OB1 takes an attack against an enemy (or the object OB2) located forward relative to the object OB1. According to this embodiment, thus, the object OB1 will take a motion of attack against the enemy only by tilting an analog lever in the tilting direction corresponding to the direction in which the enemy exists by a fine angle (β1). Thus, an attack wanted by the player can be realized through only one action in which the analog lever is simply tilted. This can provide an operating environment which can easily and intuitively be understood by the player.

Figure 7A:
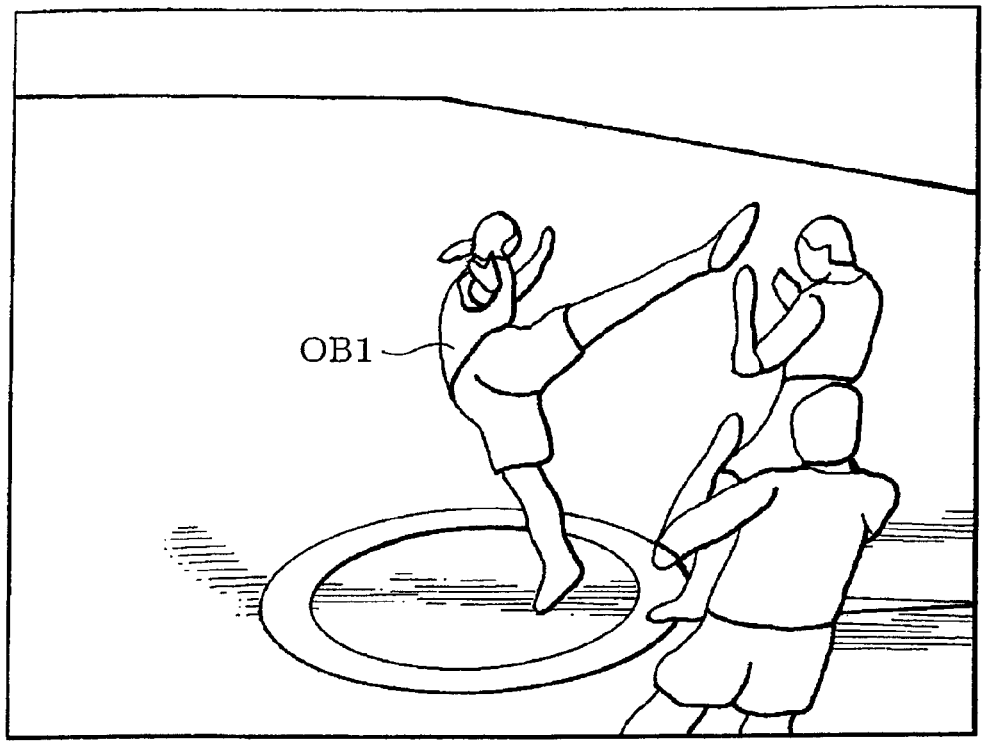
FIGS. 7A and 7B show game pictures generated according to this embodiment.
Figure 7B:
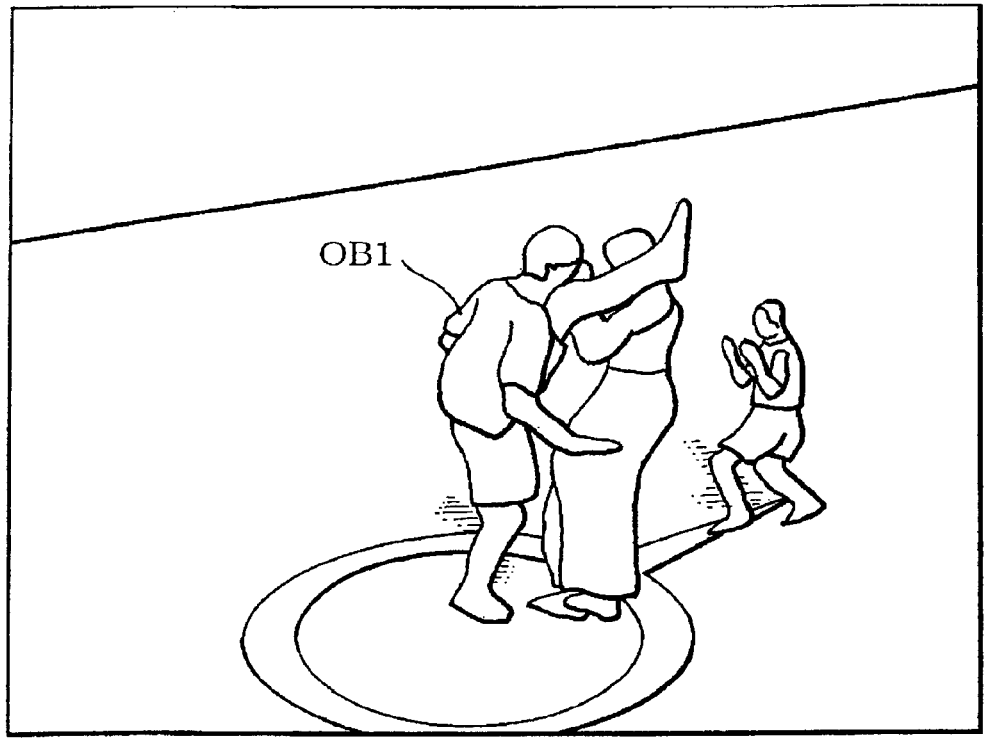

FIG. 7A shows a game picture in which the object OB1 takes an attack against an enemy located leftward relative to the object OB1 by tilting the analog lever. FIG. 7B shows a game picture in which the object OB1 takes an attack against an enemy located backward relative to the object OB1.

As will be apparent from comparison of FIGS. 6B, 7A and 7B, this embodiment multiply changes the motion of attack in the object OB1 depending on the direction of the enemy. Namely, the motion of attack in the object OB1 will automatically be changed depending on the direction of the enemy even though the player performs no specific complicated operation. As a result, the image can multiply be represented under a simplified control environment.

Figure 8A:
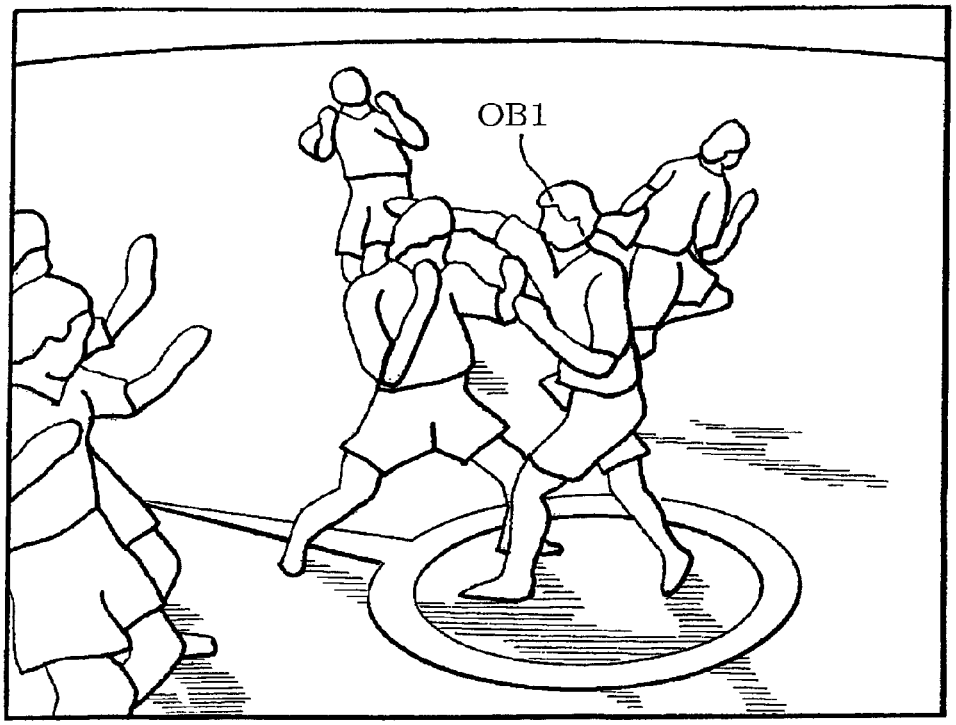
FIGS. 8A and 8B show game pictures generated according to this embodiment.
Figure 8B:
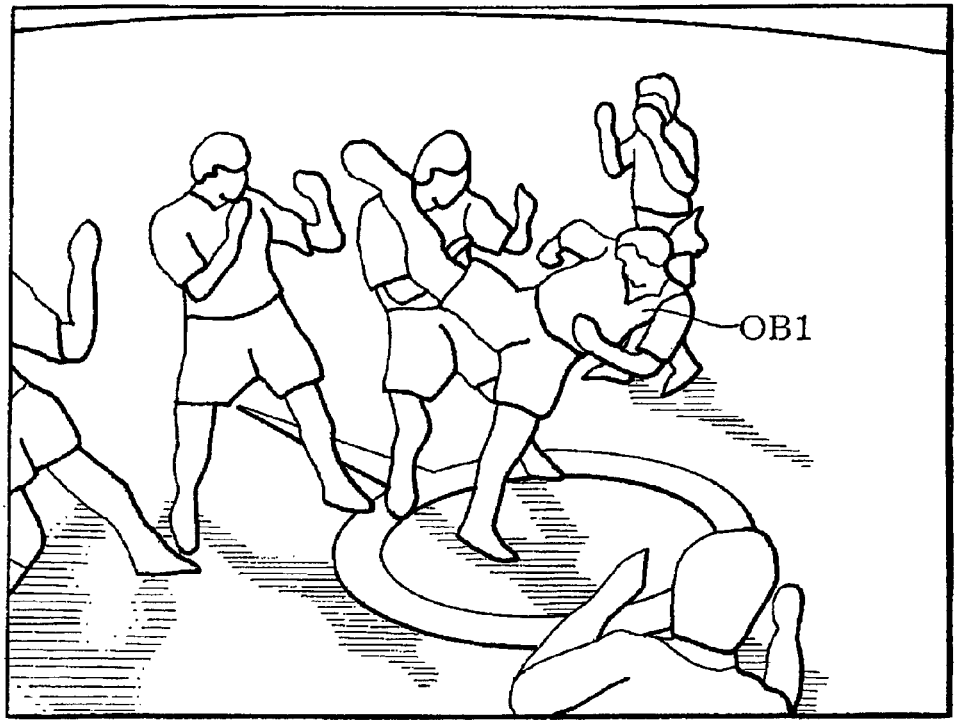
Figure 9:
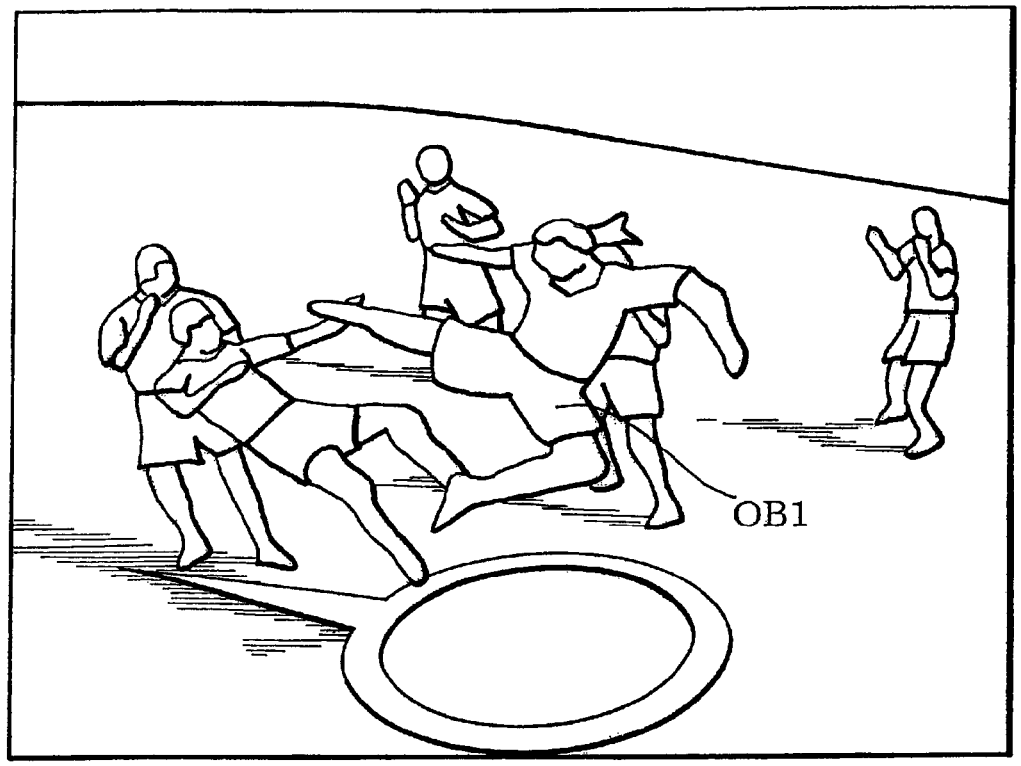
FIG. 9 shows a game picture generated according to this embodiment.

FIG. 8A shows a game picture in which the distance R between the object OB1 and an enemy (or the object OB2) is short. FIGS. 8B and 9 show game pictures in which the distance R is middle and long, respectively.

As will be apparent from comparison of FIGS. 8A, 9B and 9, this embodiment changes the motion of attack in the object OB1 depending on the distance between the object OB1 and the enemy. Namely, the motion of attack in the object OB1 will automatically be changed depending on the distance between the object OB1 and the enemy even though the player performs no specific complicated operation. As a result, the image can multiply be represented under a simplified control environment.

2.3 Judgment of Directional Range

In this embodiment, the object OB1 is caused to perform the motion of attack by judging a range of direction in which the object OB2 exists.

Figure 10A:
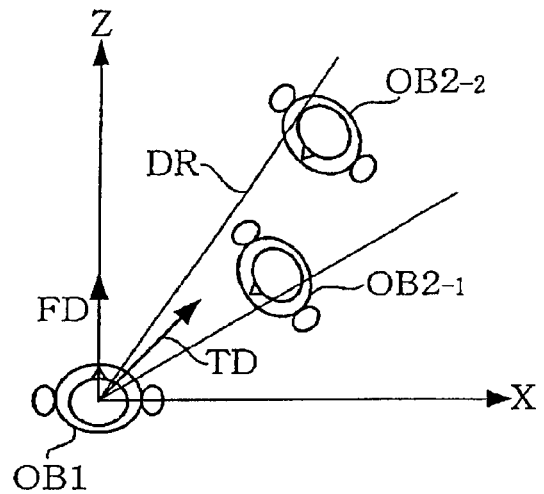
FIGS. 10A, 10B and 10C illustrate a technique of determining the motion of the object OB1 after it has been judged whether or not the object OB2 exists within the range of direction determined by a tilting direction of an analog lever.

More particularly, in FIG. 10A, enemy objects OB2-1 and OB2-2 exist in a range of direction DR which is determined by the tilting direction TD of an analog lever (AL1). In such a case, therefore, the object OB1 is caused to perform a motion in which it takes an attack (or action) against the object OB2-1 or 2-2. Which enemy object 2-1 or 2-2 is to be attacked by the object OB1 is determined depending on the distance between either of the enemy object 2-1 or 2-2 and the object OB1. Any enemy object which is nearer the object OB1 may be selected. Alternatively, the enemy object to be attacked may be determined depending on the amount of deviation between the tilting direction TD and the direction in which the enemy object exists. Any enemy object having a reduced amount of deviation may be selected.

Figure 10B:
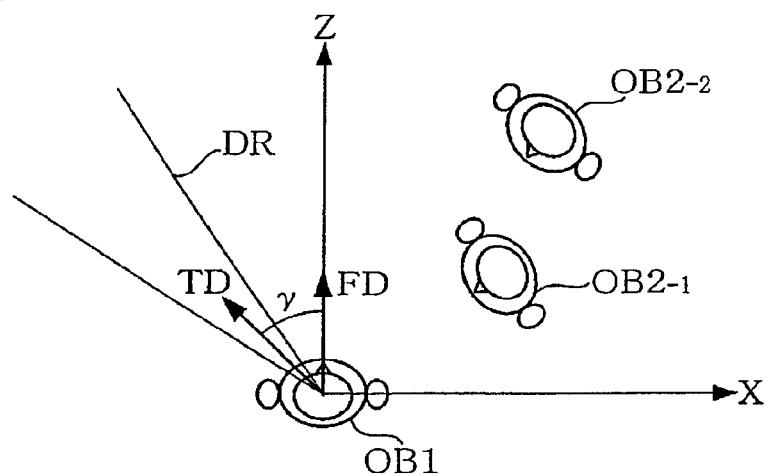

On the other hand, in FIG. 10B, no enemy object exists in the range of direction DR determined by the tilting direction of the analog lever. In such a case, therefore, the attack will fail. For example, the object OB1 may perform a motion of missing the target.

In such a case, it is desirable that the object OB1 is caused to perform a motion depending on the angle γ included between the direction to which the object OB1 faces and the tilting direction TD of the analog lever in order to provide more realistic and multiple game pictures.

Thus, the motion of the object OB1 will multiply be changed depending on the tilting direction TD of the analog lever, thereby effectively preventing the motion of missing the target in the object OB1 from being dull.

As shown in FIG. 1C, plural ranges of direction DR0 to DR24 (which are, in a broad sense, DR0 to DRM) divided through a range between 0 and 360 degrees may previously be set. In this case, one motion of attack (or motion data) has been associated with each of the ranges of direction DR0 to DR24. Any one of these ranges of direction DR0 to DR24 will be selected depending on the tilting direction TD of the analog lever. A motion of attack associated with the selected range of direction will then be played.

Thus, the motion of attack in the object OB1 can be determined through a simplified process, thereby reducing the processing load. Since motions of attack corresponding to the number of direction ranges are only required, therefore, the amount of data in the motion data can be reduced, thereby saving the capacity of the memory.

The motion of attack in the object OB1 may be determined by interpolating between the motions of attack associated with the respective ranges of direction.

2.4 Change of Motion Depending on Times Required to Tilt and Return the Analog Lever In this embodiment, the motion of the object OB1 is changed (or different motions of the object OB1 are provided) depending on a time required to tilt the analog lever by a desired angle (velocity of tilt) and another time until the analog lever returns to its neutral position (velocity of return).

Figure 11A:
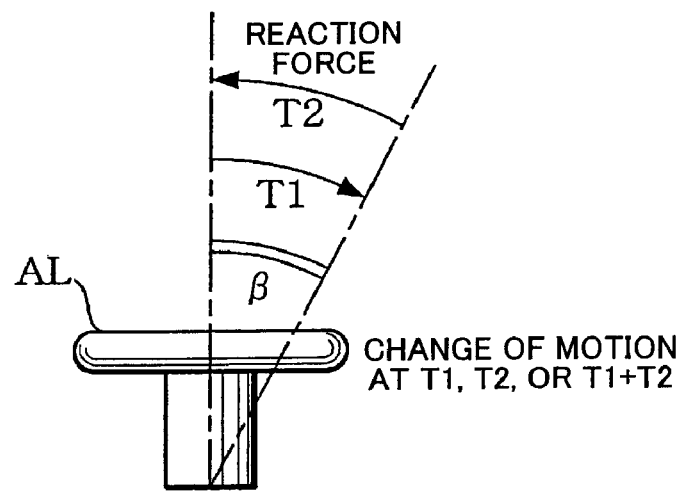
FIGS. 11A and 11B illustrate a technique of realizing a quick motion of an object by quickly actuating an analog lever.

More particularly, as shown in FIG. 11a, the motion of the object OB1 is changed depending on a time T1 required to tilt the analog lever AL (AL1) from its neutral position by an angle β. Alternatively, the motion of the object OB1 may be changed depending on a time T2 required to return the analog lever AL from its tilted (angle β) position to its neutral position under reaction force. The angle β may be different between the tilted analog lever AL and the returned analog lever AL.

Figure 11B:
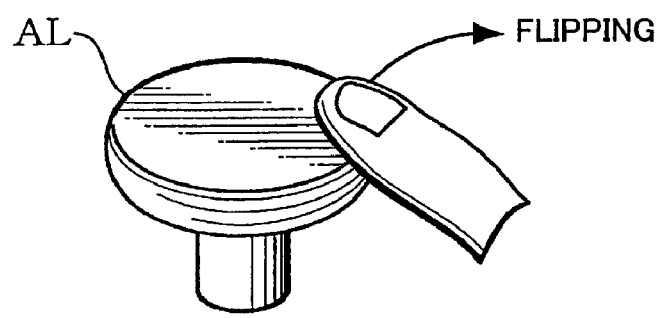
Figure 12A:
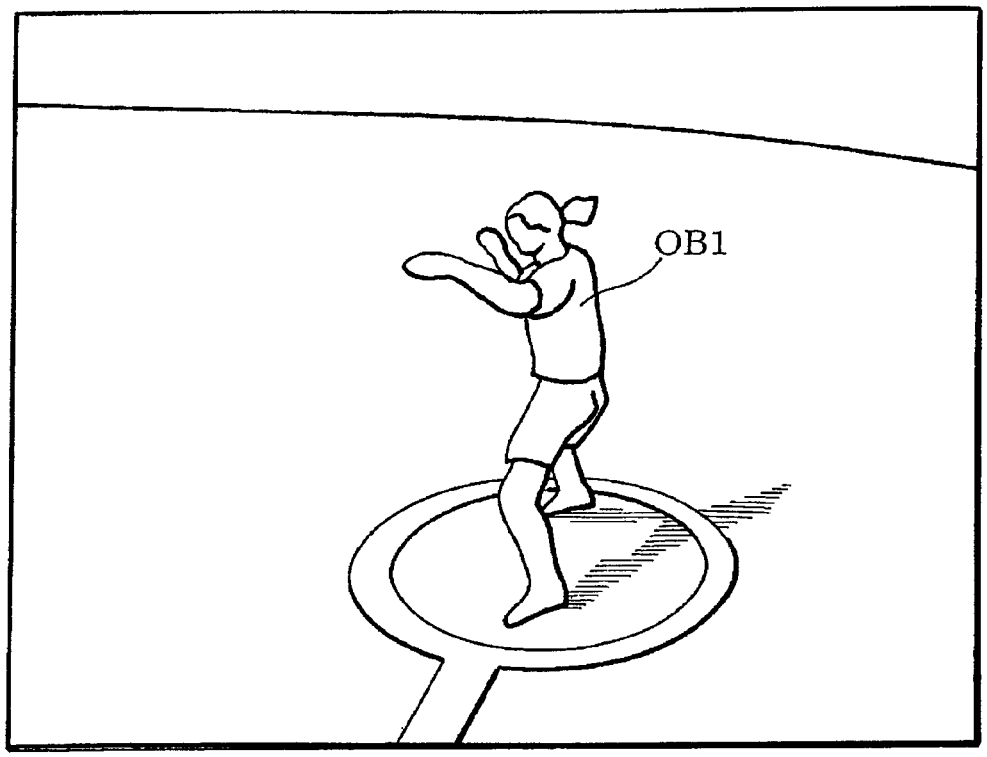
FIGS. 12A and 12B show game pictures generated according to this embodiment.

As shown in FIG. 11B, thus, the object OB1 can be caused to perform such a jab motion (or quick motion) as shown in FIG. 12A, for example, if the analog lever AL is flipped by the player with his or her finger (quick operation).

If the player quickly operates the analog lever AL in a flipping manner as shown in FIG. 11B, the time T1 or T2 of FIG. 11A will be shortened. If at least one of the times T1 and T2 is shortened, the object OB1 is caused to perform such a jab motion as shown in FIG. 12A (which is, in a broad sense, a first motion or a motion in which the motion play time is shorter or a motion in which the action is faster).

Figure 12B:
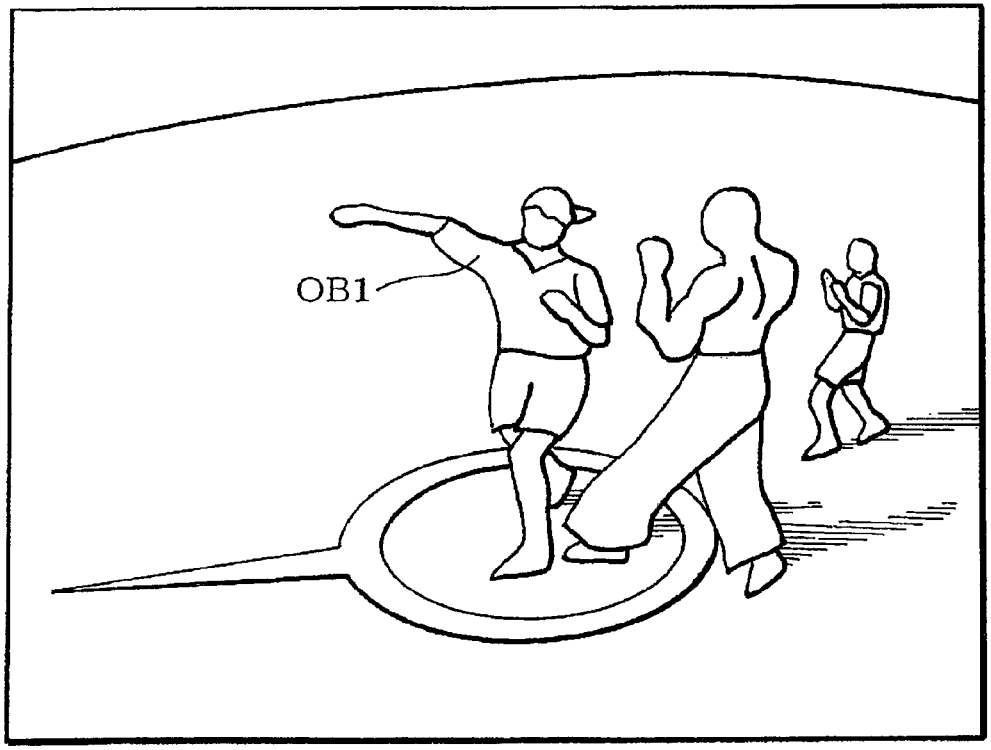

If the player operates the analog lever AL at the normal velocity, the time T1 or T2 of FIG. 11A is prolonged in comparison of the flipping operation. If at least one of the times T1 and T2 is longer, the object OB1 is caused to perform such a hook motion as shown in FIG. 12B (which is, in a broad sense, a second motion or a motion in which the motion play time is longer or a motion in which the action is slower).

Thus, the motion of the object OB1 can multiply be changed merely by changing the velocity at which the player operates the analog lever AL. Therefore, more realistic and multiple images can be represented without making the operating environment of the player complicated.

The motion of the object OB1 may be changed depending on only either of the time T1 or T2. Alternatively, the motion of the object OB1 may be changed depending on the sum of the times T1 and T2 (or time under influence of both the times T1 and T2).

For example, taking the first technique of changing the motion depending on the time T1, the velocity of tilt at which the analog lever AL is tilted can immediately be detected to play such a jab motion as shown in FIG. 12A. This can provide a feel of quick operation.

On the other hand, taking the second technique of changing the motion depending on the time T2, uncertain factors associated with measuring of time can be reduced. If the player operates the analog lever AL in an active manner, the velocity (or time) on operation may be vary. It is thud difficult to judge whether or not the player performed a quick operation.

On the contrary, the time T2 is one that is required to return to its neutral position under reaction force due to a resilient member (not shown). Therefore, it will not depend on the velocity at which the player operates the analog lever AL and be substantially invariable. Since the time T2 will hardly vary, therefore, it can easily be judged whether or not the player performed the quick operation (or flipping operation). In this sense, it is thus desirable to take the second technique rather than the first technique.

In order to utilize the advantages of both the first and second techniques, it is desirable to take a third technique of changing the motion depending on the sum of the first and second times (or time under influence of both the first and second times). Such a third technique can realize the environment of quick operation since the motion is changed in consideration of the first time T1. Furthermore, uncertain factors on measuring of time can be reduced since the motion is also changed in consideration of the second time T2.

The object OB1 may hasten to be caused to initiate the jab motion (or first motion) if the analog lever AL is tilted by a given angle β1. Thereafter, if the analog lever AL is tilted by another given angle β2(=β), time required to complete this tile T1, T2 or T1+T2 may be judged. Based on such a judgment, the initiated jab motion may be changed.

More particularly, if the time T1, T2 or T1+T2 is relatively short, the object OB1 is caused to continue such a jab motion as shown in FIG. 12A.

On the other hand, if the time T1, T2 or T1+T2 is relatively long, the object OB1 is caused to perform such a hook motion (or second motion) as shown in FIG. 12B. In such a case, a joining motion between the jump and hook motions is desirably generated through an interpolation of motion (or an interpolation between joints or bones in a skeleton model).

Thus, the motion of the object OB1 is initiated at a point of time when the analog lever AL is tilted by the fine angle β1. Therefore, an environment of quick operation can be realized. If the analog lever AL is further tilted, the motion of the object OB1 will be changed depending on the velocity of tilt or return in that analog lever AL. As a result, multiple images of motion can be realized.

2.5 Initiation of Motion and Determination of Motion Direction

Figure 13A:
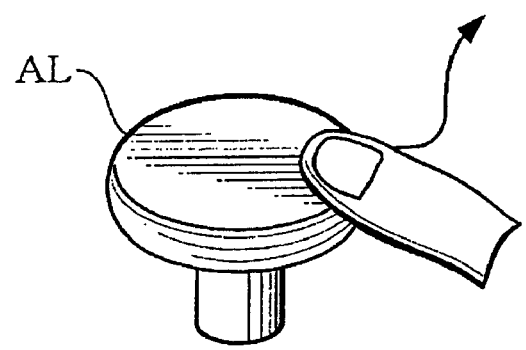
FIGS. 13A, 13B, 13C and 13D illustrate a technique of initiation a motion by finely actuating an analog lever and thereafter determining the direction of motion.

The analog lever AL can be tilted in any direction to provide an increased degree of freedom in the player's operation. Conversely, the tilting direction of the analog lever AL multiply varies depending on the accuracy in the player's operation. This may frequently provide such a serpentine operation as shown in FIGS. 13A and B.

In such a case, if the tilting direction of the analog lever AL is determined to establish a direction in which the object OB1 is to perform an attack (or direction of attack or action) immediately as the player begins to tilt the analog lever AL, the object OB1 may probably perform a motion in a direction different from a direction intended by the player.

Figure 13B:
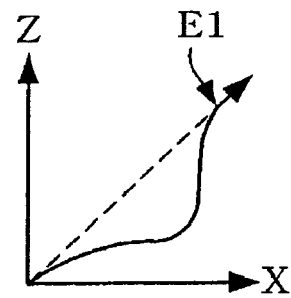
Figure 13C:
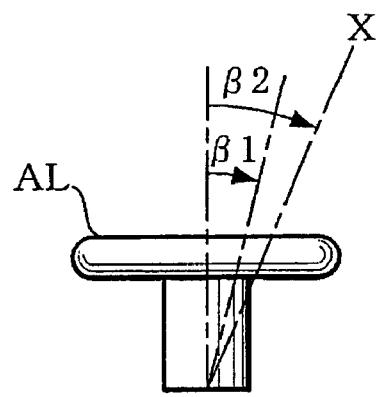
Figure 13D:
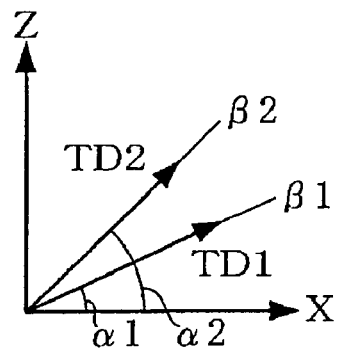

To avoid such a problem, this embodiment hastens to initiate the motion of the object at a step whereat the analog lever AL (AL1) has been tilted by the angle β1 (e.g., a fine angle for securing a play), as shown in FIG. 13C. In this case, the direction in which the object OB1 is to perform a motion (or direction of attack or action) is set to be in a direction corresponding to the tilting direction TD1 (angle α1) when the analog lever AL is tilted by the angle β1 as shown in FIG. 13D.

If the analog lever AL is further tilted to a further angle β2 (β2>β1), the direction in which the object OB1 is to perform the motion is finally determined. For example, the direction in which the object OB1 is to perform the motion may be determined to be in a direction corresponding to the tilting direction TD2 (angle α2) when the analog lever AL is tilted by the angle β2 as shown in FIG. 13d.

Thus, the environment of quick operation can be provided to the player since the motion of the object OB1 hastens to be initiated at a step whereat the analog lever AL is slightly tilted.

Therefore, the object OB1 can be caused to perform the motion in a direction (or direction of attack or action) corresponding to the final tilting direction (TD2 of FIG. 13D) as shown by E1 in FIG. 13B even though the player operates the analog lever AL in a serpentine manner as shown in FIG. 13A. Since the object OB1 performs the motion in a direction actually intended by the player, an operating environment which is felt by the player to be nature can be provided.

It is further desirable that if the analog lever AL is tilted by the angle β2, the orientation of the object OB1 is compensated relative to a direction (or direction of attack or action) corresponding to the tilting direction TD2 of the analog lever AL at that time.

Figure 14:
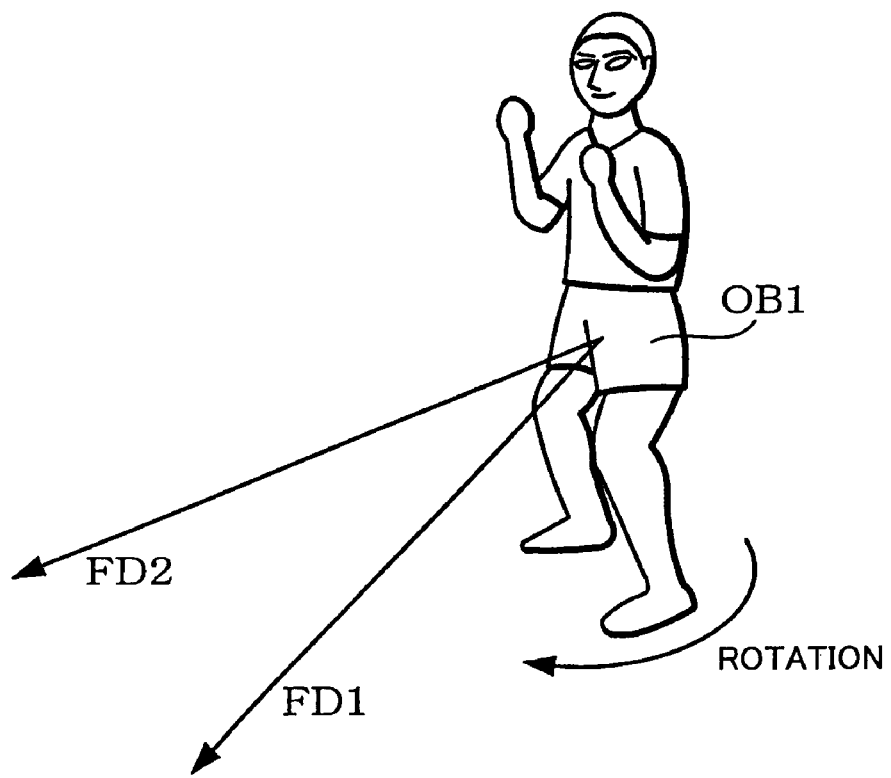
FIG. 14 illustrates a technique of compensating the orientation of an object.

More particularly, if the orientation of the object OB1 is FD1 when the angle of the tilted analog lever AL is β as shown in FIG. 14 and when the tilt angle is β2, the orientation of the object OB1 is compensated to be in the direction FD2 corresponding to the tilting direction at that time. This can be realized by rotating the object OB1 about a given rotation axis (e.g., the central axis of the object OB1 along the longitudinal direction). Thus, the orientation of the object OB1 can be changed while causing it to perform the motion. This can provide a motion picture which hardly provides a sense of incompatibility to the player.

3. Processings of this Embodiment

Figure 15:
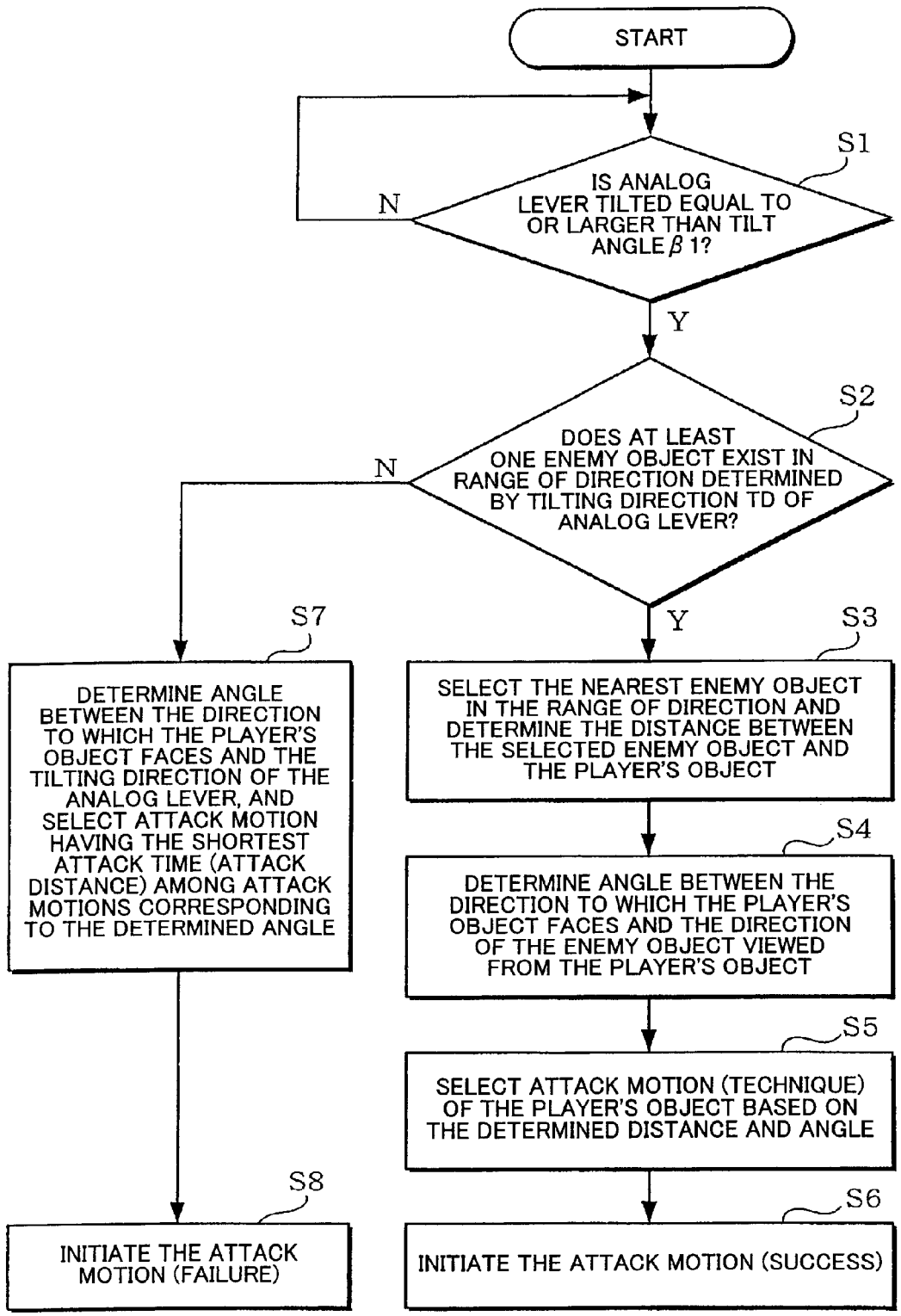
FIG. 15 is a flowchart illustrating the details of a process in this embodiment.

Processings in this embodiment will now be described in detail with reference to flowcharts shown in FIGS. 15, 16 and 17.

Figure 10C:
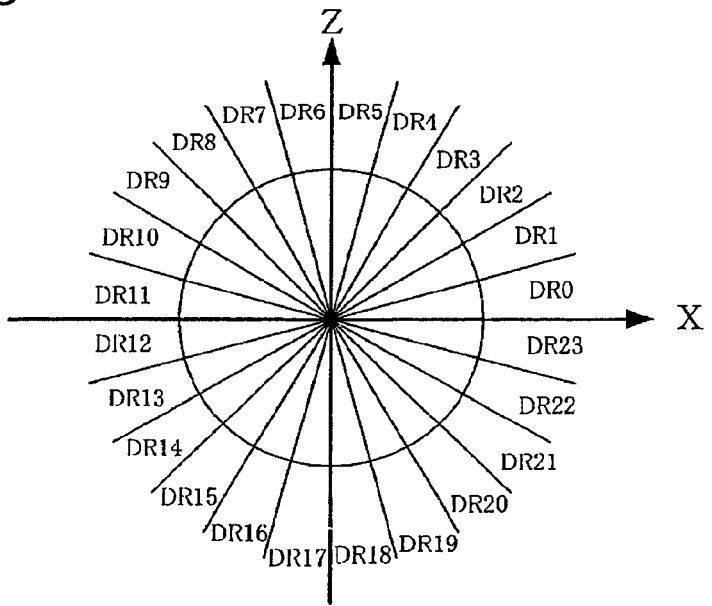

First of all, it is judged whether or not the analog lever (AL1) is tilted by an angle equal to or larger than the tilt angle β1 (or angle for securing the play) (step S1). If so, it is then judged whether or not at least one enemy object exist within a range of direction determined by the tilting direction TD of the analog lever (step S2 and see FIGS. 10A, 10B and 10C).

If at least one enemy object exists, an enemy object located nearest the player's object within that range of direction is selected. The distance between the selected enemy object and the player's object is then determined (step S3). In addition, an angle included between the direction to which the player's object (or object controlled by the player) faces and the direction in which the player views the enemy object (or direction of existence) is determined (step S4). Based on the distance determined at the step S3 and the angle determined at the step S4, an attack motion (technique) of the player's object is selected (step S5 and see FIGS. 5A, 5B and 5C). The selected attack motion (or success motion) begins to be played (step S6).

If it is judged at the step S2 that no enemy object exists within the range of direction, an angle included between the direction to which the player's object faces and the tilting direction of the analog lever is determined. An attack motion having a shortest attack time (or attack distance) is then selected from the attack motions depending on the determined angle (step S7 and see FIG. 10B). The selected attack motion (failure motion or motion of missing the target) is then played (step S8).

Figure 16:
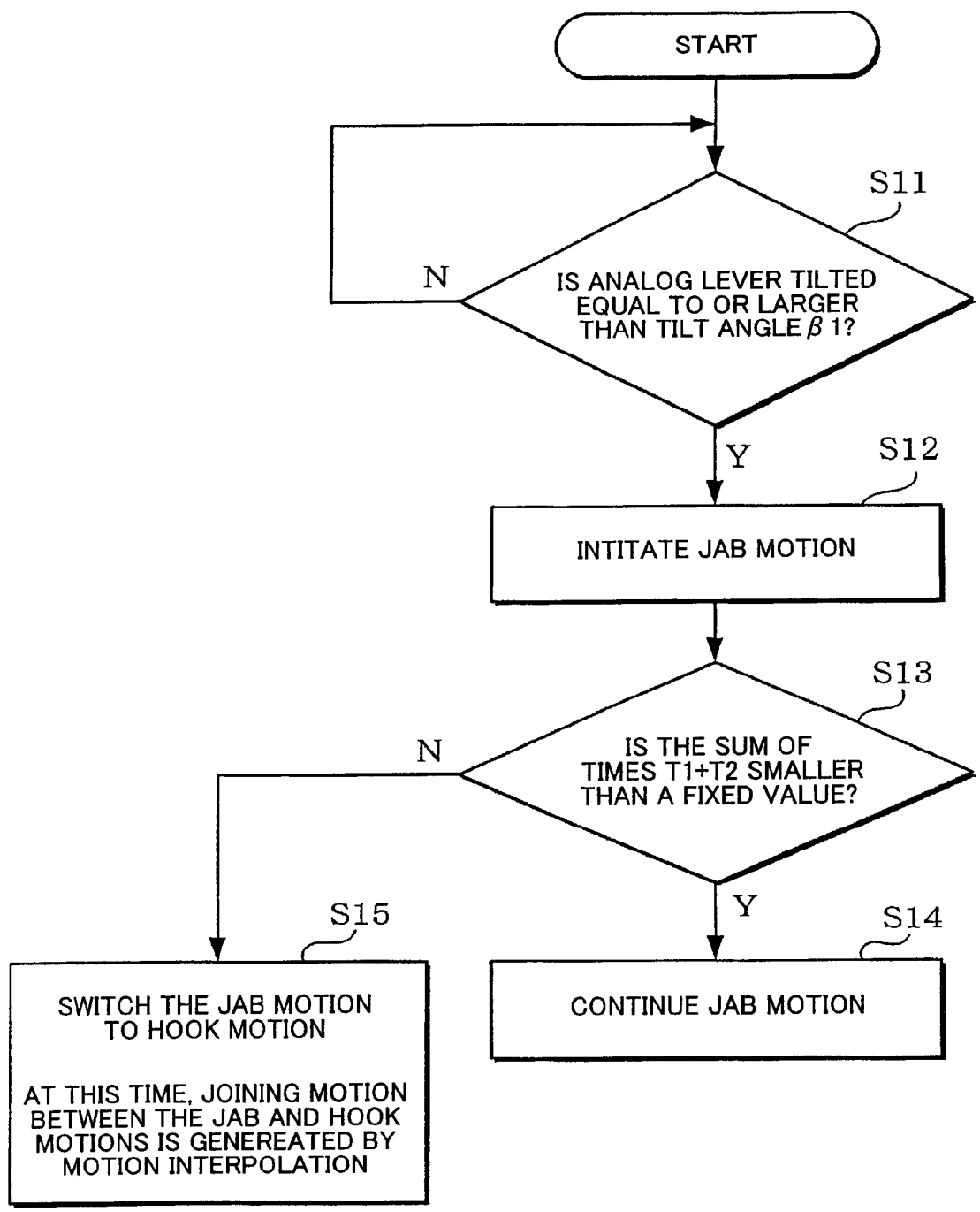
FIG. 16 is a flowchart illustrating the details of another process in this embodiment.

FIG. 16 is a flowchart illustrating a quick motion processing through such a quick (or flipping) operation as described in connection with FIGS. 11A to 12B.

It is first judged whether or not the analog lever (AL1) is tilted by an angle equal to or larger than the tilt angle β1 (step S11). If so, the jab motion of FIG. 12a (first or quick motion) hastens to be initiated (step S12).

It is then judged whether or not the sum of times T1+T2 (or T1 or T2) as described in connection with FIG. 11A is smaller than a fixed value (step S13). If so, the jab motion of FIG. 12A is continued (step S14). If the sum of times is larger than the fixed value, the jab motion (or first motion) is switched to such a hook motion (or second motion) as shown in FIG. 12B (step S15). At this time, a joining motion between the jump and hook motions is generated and played through motion interpolation.

Figure 17:
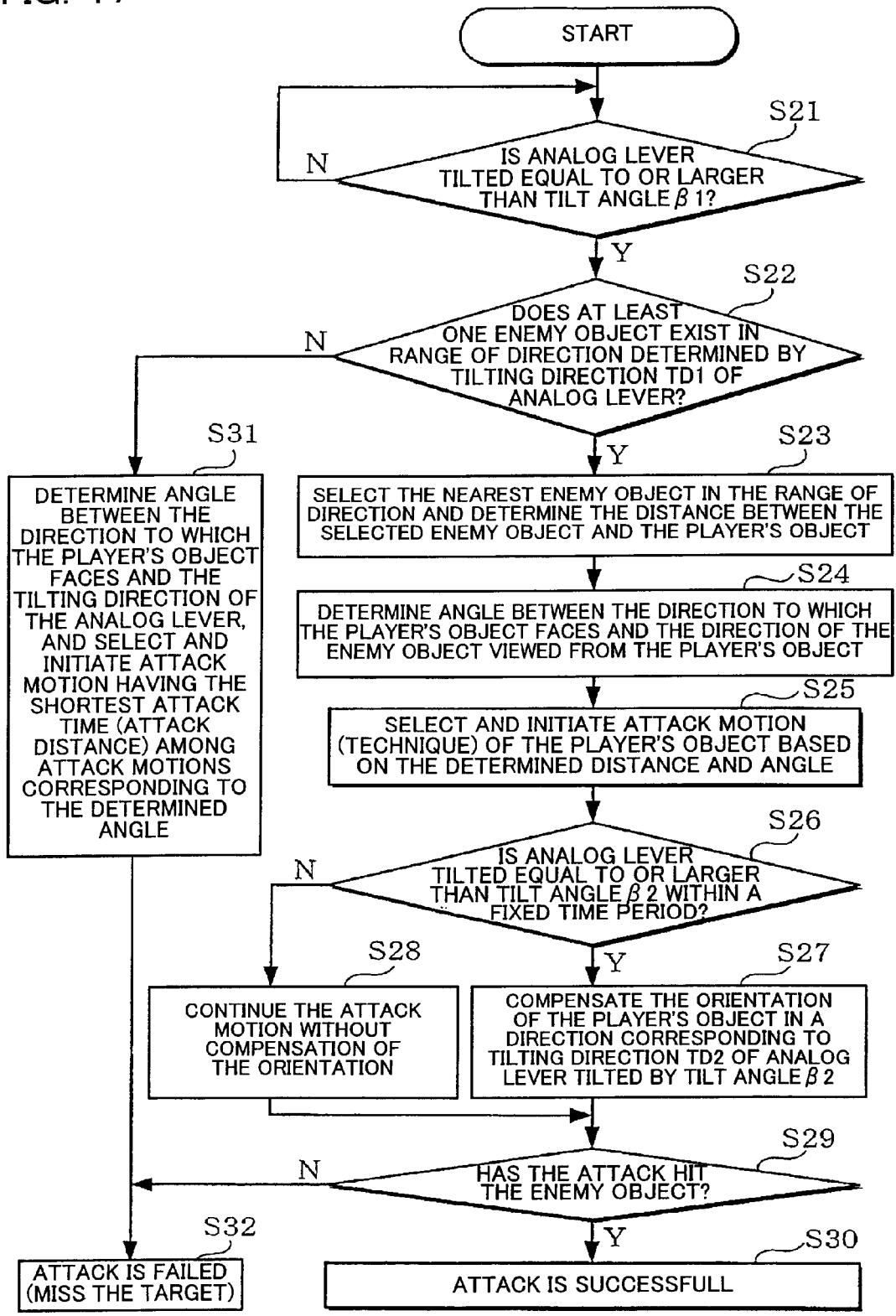
FIG. 17 is a flowchart illustrating the details of still another process in this embodiment.

FIG. 17 is a flowchart illustrating a process of initiating a motion through a fine operation of the analog lever and then determining the direction of motion, as described in connection with FIGS. 13A to 14.

It is first judged whether or not the analog lever (AL1) is tilted by an angle equal to or larger than the tilt angle β1 (step S21). If so, it is then judged whether or not at least one enemy object exists within a range of direction determined by the tilting direction TD of the analog lever (see FIG. 13D) (step S22).

If at least one enemy object exists, an enemy object located nearest the player's object within that range of direction is selected. The distance between the selected enemy object and the player's object is determined (step S23). Furthermore, an angle included between the direction to which the player's object faces and the direction in which the player's object views the enemy object is determined (step S24). Based on the distance and angle determined respectively at the steps S23 and 24, an attack motion of the player's object is selected and initiated to play (step S25).

It is then judged whether or not the analog lever is tilted by an angle equal to or larger than the tilt angle β2 (>β1) within a fixed time period after the analog lever has been tilted by the tilt angle β1 (step S26). If so, the orientation of the player's object is compensated in a direction corresponding to the tilting direction TD2 of the analog lever when it is tilted by the tilt angle β2 (see FIG. 13D), as described in connection with FIG. 14 (step S27). If not so, the orientation of the player's object will not be compensated. The attack motion at the step S25 is continuously played (step S28).

It is then judged whether or not the attack hits the enemy object (step S29). If so, it is judged that the attack is successful (step S30). If not so, it is judged that the attack has failed (miss the target) (step S32).

If it is judged at the step S22 that no enemy object exists within the range of direction, an angle between the direction to which the player's object faces and the tilting direction of the analog lever is determined. An attack motion having the shortest attack time (or attack distance) is selected from the attack motions corresponding to the determined angle. The selected attack motion is then played (step S31). In this case, it is judged that the attack failed (step S32).

4. Hardware Configuration

Figure 18:
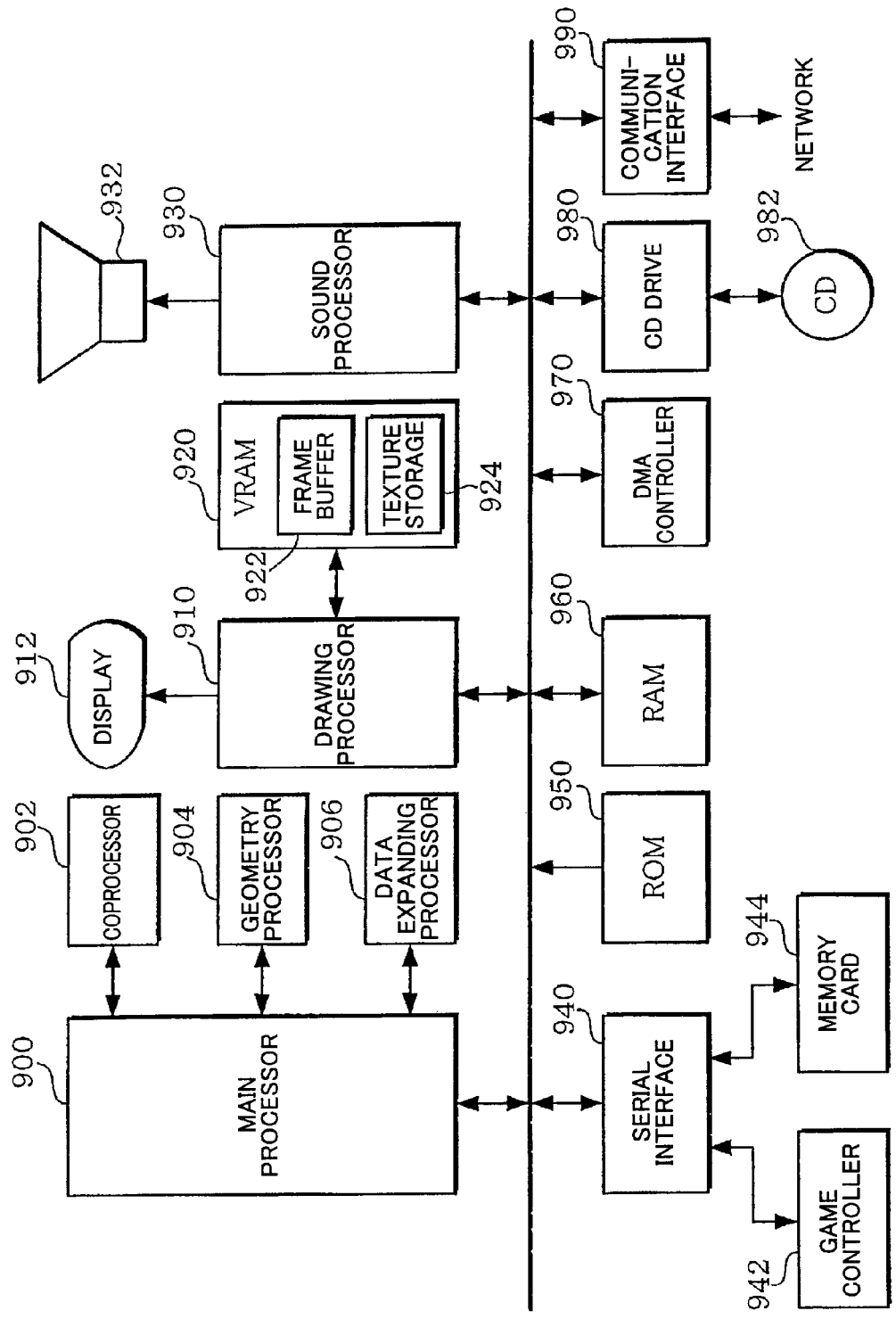
FIG. 18 shows a hardware structure by which this embodiment can be realized.

A hardware arrangement which can realize this embodiment is shown in FIG. 18.

A main processor 900 operates to execute various processings such as game processing, image processing, sound processing and other processings according to a program stored in a CD (information storage medium) 982, a program transferred through a communication interface 990 or a program stored in a ROM (information storage medium) 950.

A coprocessor 902 is to assist the processing of the main processor 900 and has a product-sum operator and analog divider which can perform high-speed parallel calculation to execute a matrix (or vector) calculation at high speed. If a physical simulation for causing an object to move or act (motion) requires the matrix calculation or the like, the program running on the main processor 900 instructs (or asks) that processing to the coprocessor 902.

A geometry processor 904 is to perform a geometry processing such as coordinate transformation, perspective transformation, light source calculation, curve formation or the like and has a product-sum operator and analog divider which can perform high-speed parallel calculation to execute a matrix (or vector) calculation at high speed. For example, for the coordinate transformation, perspective transformation or light source calculation, the program running on the main processor 900 instructs that processing to the geometry processor 904.

A data expanding processor 906 is to perform a decoding process for expanding image and sound compressed data or a process for accelerating the decoding process in the main processor 900. In the opening, intermission, ending or game scene, thus, an MPEG compressed animation may be displayed. The image and sound data to be decoded may be stored in the storage devices including ROM 950 and CD 982 or may externally be transferred through the communication interface 990.

A drawing processor 910 is to draw or render an object constructed by primitives (or primitive faces) such as polygons or curved faces at high speed. On drawing the object, the main processor 900 uses a DMA controller 970 to deliver the object data to the drawing processor 910 and also to transfer a texture to a texture storage section 924, if necessary. Thus, the drawing processor 910 draws the object in a frame buffer 922 at high speed while performing a hidden-surface removal by the use of a Z-buffer or the like, based on the object data and texture. The drawing processor 910 can also perform α-blending (or translucency processing), mip-mapping, fogging, tri-linear filtering, anti-aliasing, shading and so on. As the image for one frame is written into the frame buffer 922, that image is displayed on a display 912.

A sound processor 930 includes any multi-channel ADPCM sound source or the like to generate high-quality game sounds such as BGMs, sound effects and voices. The generated game sounds are outputted from a speaker 932.

The operational data from a game controller 942 (such as a lever, button, housing, pad-shaped controller or gun-shaped controller) and the saved and personal data from a memory card 944 may externally be transferred through a serial interface 940.

ROM 950 has stored a system program and so on. For an arcade game system, the ROM 950 functions as an information storage medium in which various programs have been stored. The ROM 950 may be replaced by any suitable hard disk.

RAM 960 is used as a working area for various processors.

The DMA controller 970 controls the transfer of DMA between the processors and memories (such as RAMs, VRAMs, ROMs or the like).

CD drive 980 drives a CD (information storage medium) 982 in which the programs, image data or sound data have been stored and enables these programs and data to be accessed.

The communication interface 990 is to perform data transfer between the image generating system and any external instrument through a network. In such a case, the network connectable with the communication interface 990 may take any of communication lines (analog phone line or ISDN) or high-speed serial interface bus. The use of the communication line enables the data transfer to be performed through the INTERNET. If the high-speed serial interface bus is used, the data transfer may be carried out between the image generating system and any other game system.

All the processings of the present invention may be executed only through hardware or only through a program which has been stored in an information storage medium or which is distributed through the communication interface. Alternatively, they may be executed both through the hardware and program.

If all the means of the present invention are executed both through the hardware and program, the information storage medium stores a program for causing hardware (or a computer) to realize the respective processings of the present invention. More particularly, the aforementioned program instructs the respective processors 902, 904, 906, 910 and 930 which are hardware and also delivers the data to them, if necessary. Each of the processors 902, 904, 906, 910 and 930 will execute the corresponding one of the means of the present invention based on the instruction and delivered data.

Figure 19A:
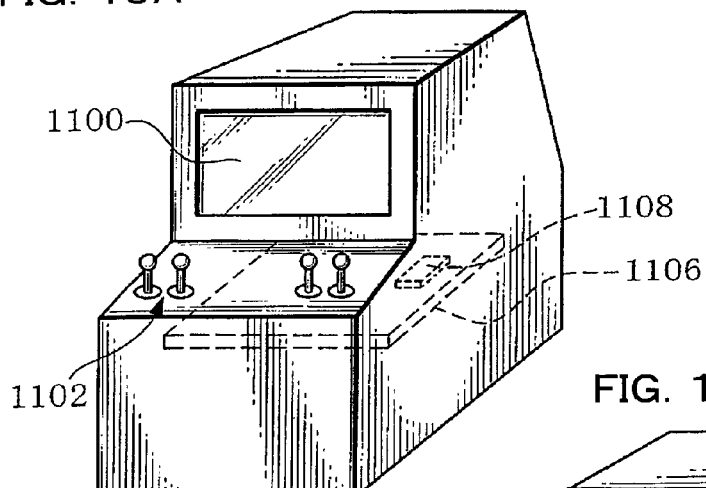
FIGS. 19A, 19B and 19C show various system forms to which this embodiment can be applied.

FIG. 19A shows an arcade game system (or image generating system) to which this embodiment is applied. Players enjoy a game by controlling a controller 1102 and so on while viewing a game scene displayed on a display 1100. A system board (circuit board) 1106 included in the game system includes various processor and memories which are mounted thereon. Program (or data) for realizing all the processings of the present invention has been stored in a memory 1108 on the system board 1106, which is an information storage medium. Such program will be referred to "the stored program (information)" later.

Figure 19B:
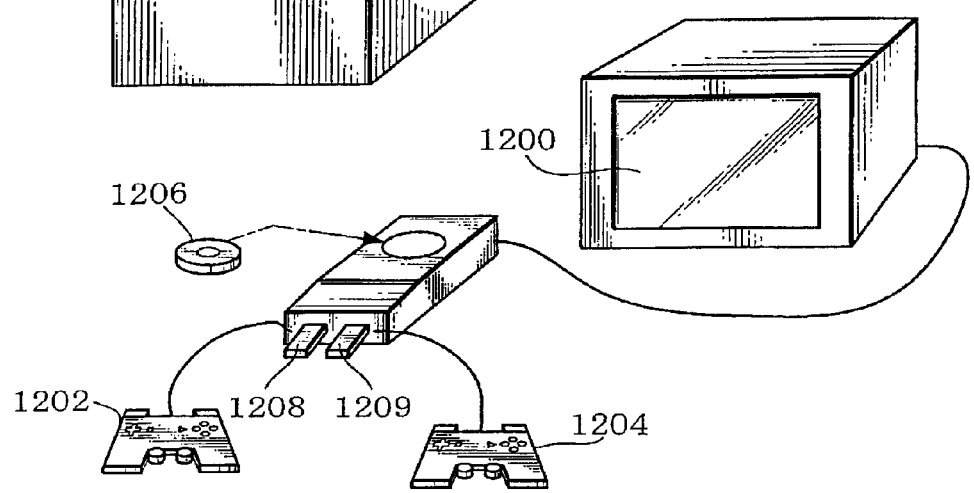

FIG. 19B shows a home game apparatus (or image generating system) to which this embodiment is applied. A player enjoys a game by manipulating game controllers 1202, 1204 and so on while viewing a game picture displayed on a display 1200. In such a case, the aforementioned stored information pieces have been stored in CD 1206 or memory cards 1208, 1209 which are detachable information storage media in the game system body.

Figure 19C:
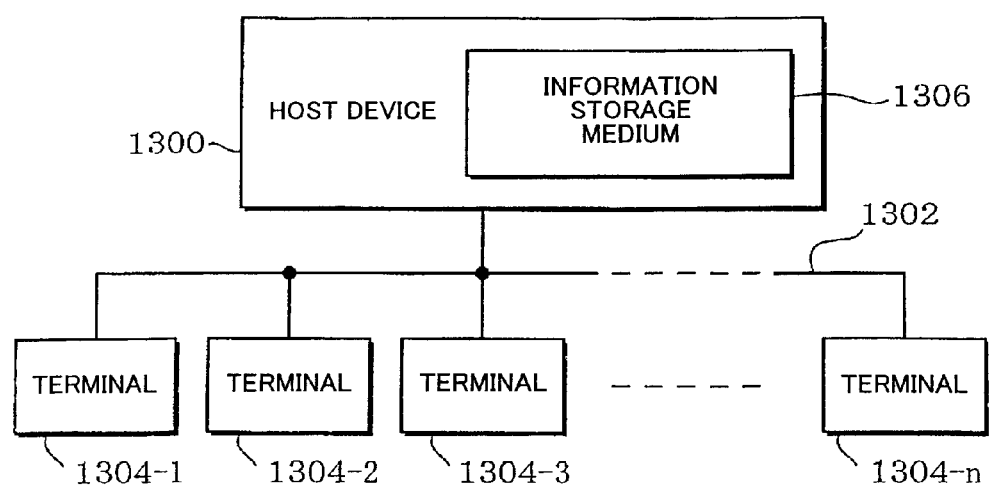

FIG. 19C shows an example wherein this embodiment is applied to a game system which includes a host device 1300 and terminals 1304-1 to 1304-*n* (or game machines or portable telephones) connected to the host device 1300 through a network (which is a small-scale network such as LAN or a global network such as INTERNET) 1302. In such a case, the above stored program (information) has been stored in an information storage medium 1306 such as magnetic disk device, magnetic tape device, memory or the like which can be controlled by the host device 1300, for example. If each of the terminals 1304-1 to 1304-*n* are designed to generate game images and game sounds in a stand-alone manner, the host device 1300 delivers the game program and other data for generating game images and game sounds to the terminals 1304-1 to 1304-*n*. On the other hand, if the game images and sounds cannot be generated by the terminals in the stand-alone manner, the host device 1300 will generate the game images and sounds which are in turn transmitted to the terminals 1304-1 to 1304-*n*.

In the arrangement of FIG. 19C, the processings of the present invention may be decentralized into the host device (or server) and terminals. The above stored program (information) for realizing the respective processings of the present invention may be distributed and stored into the information storage media of the host device (or server) and terminals.

Each of the terminals connected to the network may be either of home or arcade type. When the arcade game systems are connected to the network, it is desirable that each of the arcade game systems includes a portable information storage device (memory card or portable game machine) which can not only transmit the information between the arcade game systems but also transmit the information between the arcade game systems and the home game systems.

The present invention is not limited to the things described in connection with the above forms, but may be carried out in any of various other forms.

For example, the motion of the object controlled by operation of the analog lever is not limited to the attack motion, but it may be any one of various other motions (action motions)

such as a guard motion, ball kicking motion, ball catching motion and item taking motion.

The structures of the first and second control levers (or analog levers) and the technique of sensing the angle of tile and the tilting direction are not limited to those described in connection with FIGS. 3A, 3B and 3C, but they may be carried out in various other forms.

Parameters used to determine or change the motions of the object (action motion and attack motion) may be mathematically equivalent parameters other than the parameters used in this embodiment such as the angles of tilt in the control levers, the distance between the first and second objects, the angle included between the direction to which the first object faces and the direction in which the second object exists, the times required to tilt and return the control levers and the sum of times).

The invention relating to one of the dependent claims may not contain part of the structural requirements in any claim to which the one dependent claim belongs. The primary part of the invention defined by one of the independent claim may be belonged to any other independent claim.

The present invention may be applied to any of various games such as fighting games, shooting games, robot combat games, sports games, competitive games, roll-playing games, music playing games, dancing games and so on.

Furthermore, the present invention can be applied to various image generating systems (or game systems) such as arcade game systems, home game systems, large-scaled multi-player attraction systems, simulators, multimedia terminals, image generating systems, game image generating system boards and so on.

What is claimed is:

1. An image generation method of generating an image comprising:
    causing a first object to perform a motion based on control data from a first control lever which is tilted in an arbitrary direction from a neutral position and of which a tilt angle is detectable, the tilt angle being an angle between a tilted position of a shaft of the first control lever and the neutral position of the shaft of the first control lever;
    generating an image including an image of the first object;
    judging whether the tilt angle reaches a first angle;
    setting the direction in which the first object initiates the motion to be a direction corresponding to a first tilting direction of the first control lever tilted by the first angle when the tilt angle reaches the first tilt angle, and causing the first object to initiate the motion in the set direction;
    judging whether the tilt angle reaches a second angle after it is determined that the tilt angle has reached the first angle, the second angle being larger than the first angle; and
    determining a direction in which the first object performs the motion to be a direction corresponding to a second tilting direction of the first control lever tilted by the second angle when the tilt angle reaches the second angle, and causing the first object to perform the motion in the determined direction according to the second angle.

2. The image generation method as defined in claim 1, comprising:
    compensating the first object to face a direction which corresponds to the second tilting direction of the first control lever, when the first control lever is tilted by the second angle.

3. The image generation method as defined in claim 1, further comprising:
    moving the first object based on control data from a second control lever which is tilted in an arbitrary direction and of which tilt angle is detectable.

4. The image generation method according to claim 1, further comprising:
    changing the motion of the first object according to at least one of a distance between the first object and a second object and an angle between a direction to which the first object faces and a direction in which the second object exists.

5. The image generation method according to claim 1, further comprising:
    changing the motion of the first object according to at least one of a first time period required to tilt the first control lever from the neutral position by a given angle and a second time period until the first control lever returns from the tilted state to the neutral position by reaction force.

6. A computer usable program embodied on a non-transitory information storage medium which when executed by a computer processor causes the processor to execute, the program comprising:
    causing a first object to perform a motion based on control data from a first control lever which is tilted in an arbitrary direction from a neutral position and of which a tilt angle is detectable, the tilt angle being an angle between a tilted position of a shaft of the first control lever and the neutral position of the shaft of the first control lever;
    generating an image including an image of the first object;
    judging whether the tilt angle reaches a first angle; and
    judging whether the tilt angle reaches a second angle after it is determined that the tilt angle has reached the first angle, the second angle being larger than the first angle,
    a direction in which the first object initiates the motion is set to be a direction corresponding to a first tilting direction of the first control lever tilted by the first angle when the tilt angle reaches the first angle, and the first object is caused to initiate the motion in the set direction; and
    a direction in which the first object subsequently performs the motion is determined to be a direction corresponding to a second tilting direction of the first control lever tilted by the second angle when the tilt angle reaches the second angle, and the first object is caused to perform the motion in the determined direction according to the second angle.

7. The computer usable program according to claim 6, wherein the first object is compensated to face a direction which corresponds to the second tilting direction of the first control lever, when the first control lever is tilted by the second angle.

8. The computer usable program according to claim 6, wherein the first object is moved based on control data from a second control lever which is tilted in an arbitrary direction and of which tilt angle is detectable.

9. The computer usable program according to claim 6, wherein the motion of the first object is changed according to at least one of a distance between the first object and a second object and an angle between a direction to which the first object faces and a direction in which the second object exists.

10. The computer usable program according to claim 6, wherein the motion of the first object is changed according to at least one of a first time period required to tilt the first control lever from the neutral position by a given angle and a second time period until the first control lever returns from the tilted state to the neutral position by reaction force.

* * * * *